(12) United States Patent
Nakatsuka et al.

(10) Patent No.: US 8,803,401 B2
(45) Date of Patent: Aug. 12, 2014

(54) VIBRATION POWER GENERATOR, VIBRATION POWER GENERATING DEVICE, AND ELECTRONIC DEVICE AND COMMUNICATION DEVICE THAT HAVE THE VIBRATION POWER GENERATING DEVICE INSTALLED

(75) Inventors: Hiroshi Nakatsuka, Osaka (JP); Keiji Onishi, Osaka (JP)

(73) Assignee: Panasonic Corporation, Osaka (JP)

( * ) Notice: Subject to any disclaimer, the term of this patent is extended or adjusted under 35 U.S.C. 154(b) by 352 days.

(21) Appl. No.: 13/255,135

(22) PCT Filed: Dec. 2, 2010

(86) PCT No.: PCT/JP2010/007039
§ 371 (c)(1),
(2), (4) Date: Sep. 7, 2011

(87) PCT Pub. No.: WO2011/067936
PCT Pub. Date: Jun. 9, 2011

(65) Prior Publication Data
US 2011/0316384 A1 Dec. 29, 2011

(30) Foreign Application Priority Data

Dec. 3, 2009 (JP) ................ P2009-275612
Dec. 25, 2009 (JP) ................ P2009-293721

(51) Int. Cl.
*H02N 1/00* (2006.01)
*H02N 1/08* (2006.01)

(52) U.S. Cl.
CPC ..................... *H02N 1/08* (2013.01)
USPC .............. 310/309; 310/300; 322/2 A

(58) Field of Classification Search
USPC .................. 310/300, 309; 322/2 A
See application file for complete search history.

(56) References Cited

U.S. PATENT DOCUMENTS 4,711,128 A * 12/1987 Boura ................. 73/514.18
5,239,222 A * 8/1993 Higuchi et al. ........... 310/309

(Continued)

FOREIGN PATENT DOCUMENTS

CN 100544049 9/2009
JP 2005-529574 9/2005

(Continued)

OTHER PUBLICATIONS

English translation of the International Preliminary Report on Patentability issued Jul. 19, 2012 in International (PCT) Application No. PCT/JP2010/007039.

(Continued)

*Primary Examiner* — Burton Mullins
(74) *Attorney, Agent, or Firm* — Wenderoth, Lind & Ponack, L.L.P.

(57) ABSTRACT

A vibration power generator includes a first substrate, a first electrode on the first substrate, a second substrate spaced from and opposite the first substrate, and a second electrode on the second substrate. The first electrode vibrates with respect to the second substrate, and the first electrode and the second electrode include a film retaining electric charges. The vibration generator includes a third electrode with a film retaining electric charges on the first substrate, and a fourth electrode with a film retaining electric charges on the second substrate. The third electrode and the fourth electrode are arranged so that the first substrate is retained in a predetermined position when an external force does not act on the first substrate, while an electrostatic force for returning the first substrate to a predetermined position acts on the first substrate and the first substrate moves with respect to the second substrate.

19 Claims, 25 Drawing Sheets

(56) References Cited

U.S. PATENT DOCUMENTS

| | | | |
|---|---|---|---|
| 7,275,433 B2* | 10/2007 | Caminada et al. | 73/514.18 |
| 7,552,638 B2* | 6/2009 | Menard et al. | 73/514.18 |
| 8,232,879 B2* | 7/2012 | Davis | 340/572.1 |
| 8,530,004 B2* | 9/2013 | Huang et al. | 427/533 |
| 2004/0007877 A1 | 1/2004 | Boland et al. | |
| 2004/0016120 A1 | 1/2004 | Boland et al. | |
| 2007/0228887 A1 | 10/2007 | Nishigaki et al. | |
| 2009/0058224 A1 | 3/2009 | Murayama et al. | |
| 2009/0079295 A1 | 3/2009 | Naruse et al. | |
| 2009/0243426 A1 | 10/2009 | Sahin Nomaler et al. | |
| 2010/0019616 A1 | 1/2010 | Naruse et al. | |
| 2010/0079031 A1 | 4/2010 | Murayama et al. | |
| 2012/0126662 A1* | 5/2012 | Miyata | 310/300 |

FOREIGN PATENT DOCUMENTS

| | | |
|---|---|---|
| JP | 2007-312551 | 11/2007 |
| JP | 2008-278607 | 11/2008 |
| JP | 2009-55736 | 3/2009 |
| JP | 2009-81950 | 4/2009 |
| JP | 2009-95181 | 4/2009 |
| WO | 2006/064452 | 6/2006 |
| WO | 2008/026407 | 3/2008 |

OTHER PUBLICATIONS

International Search Report issued Feb. 22, 2011 in International (PCT) Application No. PCT/JP2010/007039.

Takumi Tsutsumino et al., "Seismic Power Generator Using High-Performance Polymer Electret", IEEE Int. Conf. MEMS 2006, Istanbul, pp. 98-101, Jan. 2006.

Chinese Office Action issued Aug. 27, 2013 in corresponding Chinese Patent Application No. 201080010378.X, together with English translation thereof.

* cited by examiner (a)

(b)

VIBRATION POWER GENERATOR, VIBRATION POWER GENERATING DEVICE, AND ELECTRONIC DEVICE AND COMMUNICATION DEVICE THAT HAVE THE VIBRATION POWER GENERATING DEVICE INSTALLED

BACKGROUND OF THE INVENTION

1. Technical Field

The present invention relates to a vibration power generator and a vibration power generating device, and a communication device and an electronic device having the vibration power generating device mounted thereon, and more particularly to an electrostatic induction vibration power generator and a vibration power generating device using an electret material, and a communication device and an electronic device having the vibration power generating device mounted thereon.

2. Description of the Related Art

There has been known, as a conventional vibration power generating device, a static induction vibration power generating device in which electric charges are provided to one electrode of a variable capacitance, and charges are induced to an opposed electrode by a static induction. A change in the induced electric charges is brought about by a change in electric capacity. According to the static induction vibration power generating device, electrical generation is performed by extracting the change in the electric charges as electrical energy (refer to, for example, Patent Document 1).

FIG. 24 is a schematic cross-sectional view showing a vibration power generator 10 described in Patent Document 1 (refer to FIG. 4 and pages 10 to 11 of the document) as an example of a conventional electrostatic induction vibration power generator using an electret material.

The vibration power generator 10 is composed of a first substrate 11 provided with a plurality of conductive surface regions 13, and a second substrate 16 provided with a plurality of electret material regions 15. The first substrate 11 and the second substrate 16 are arranged and spaced from each other at a predetermined interval. The second substrate 16 including electret material regions 15 is fixed. The first substrate 11 including conductive surface regions 13 is coupled to a fixation structure 17 through springs 19. The springs 19 are connected to both side surfaces of the first substrate 11, and also connected to the fixation structure 17. The first substrate 11 is capable of returning to its home position due to the springs 19, or the first substrate 11 makes a lateral motion (for example, a motion in a crosswise direction of the drawing) to be capable of returning to the home position. This movement brings about increase and decrease of the overlapping area between the electret material regions 15 and the opposed conductive surface regions 13, which results in a change of electric charges in the conductive surface regions 13. A vibration power generator (electrostatic induction vibration power generator) 10 performs electrical generation by extracting the change of electric charges as electrical energy.

Then, according to frequency of vibration used in the electrical generation, a resonance frequency of vibration of the first substrate 11 is selected.

However, in the vibration power generator 10, since the resonance frequency is determined depending on the first substrate 11 and the springs 19, there is a problem that it is difficult to reduce a resonance frequency as described hereinafter.

In order to reduce the resonance frequency, it is necessary to increase the mass of the first substrate 11 or decrease a spring constant of the springs 19. The springs 19 are usually formed of silicon or the like, and it is difficult to decrease the spring constant because of an elastic constant of the material, or the size of the spring. Therefore, it is necessary to increase the mass of the first substrate 11.

However, when the resonance frequency is reduced by increasing the mass of the first substrate 11, a large force is applied to the springs 19 by vibration of the first substrate 11 (larger strain is generated by the springs 19), thus causing a problem such as deterioration of durability of the springs 19.

In order to solve this problem, there is proposed an electrostatic induction vibration power generator using resin springs that is excellent in resistance to elastic strain and enables reduction of a resonance frequency (refer to, for example, Non-Patent Document 1).

FIG. 25 is a schematic perspective view showing a conventional vibration power generator (electrostatic induction vibration power generator) 20 using resin springs described in Non-Patent Document 1

The vibration power generator 20 is composed of a first substrate 21 with elecrets 29 formed thereon, and springs 29 made of a resin that connect the first substrate 21 to a fixation structure 27. The springs 29 is constituted using a parylene resin material having durability such as fatigue resistance, and therefore enables the first substrate 21 to vibrate at a comparatively low frequency and a large amplitude.

Furthermore, since the spring 29 has a high-aspect-ratio structure in which a ratio of the length in a width direction (y-axis direction in the drawing) and a thickness direction (z-axis direction in the drawing) of the first substrate 21 to the length in a length direction (x-axis direction in the drawing) is large, the first substrate 21 undergoes vibration (forced vibration) only in a uniaxial direction without causing vibration of the spring 29 in the width direction (y-axis direction) and the thickness direction (z-axis direction) of the substrate.

RELATED ART

Patent Document

[Patent Document 1]
  JP2005-529574A

Non-Patent Document

[Non-Patent Document 1]
  T. Tsutsumino, Y. Suzuki, N. Kasagi, and Y. Sakane, Seismic Power Generator Using High-Performance Polymer Electret, IEEE Int. Conf. MEMS 2006, Istanbul, (2006), pp.

SUMMARY OF THE INVENTION

However, with the constitution of the conventional vibration power generator 20 disclosed in Non-Patent Document 1, it is impossible to realize further frequency reduction, for example, about several Hz only by the method of increasing the mass of the first substrate 21. It is necessary to further decrease the spring constant in the x-axis direction of the resin spring 29, for example, by lengthening the resin spring 29 in the x-axis direction. As a result, the spring constant in the direction other than a desired vibration direction (for example, y-axis direction) also decreases.

Therefore, there was a problem that vibration arises in the direction other than a desired direction to external vibration.

Since a silicon substrate, a glass substrate and the like are used as the first substrate 21, while the resin springs 29 are formed of a resin such as parylene that is quite different from silicon and glass, there was a problem that the structure and process become complicated.

Furthermore, in order to ensure a desired amount of electrical generation even when the number of vibrations of the substrate decreases, there have been required a vibration power generator capable of performing electrical generation of much electric power per one vibration of the substrate, a vibration power generating device, and an electronic device and a communication device that have a vibration power generating device mounted thereon.

Such a problem is solved by the present invention and an object thereof is to provide a vibration power generator that does not require a complicated structure and process and improves mechanical reliability, and copes with frequency reduction, a vibration power generating device, and an electronic device and a communication device that have the vibration power generating device mounted thereon.

In an aspect 1, the present invention provides a vibration power generator comprising a first substrate, a first electrode arranged on the first substrate, a second substrate spaced from and opposite to the first substrate, and a second electrode arranged on the second substrate, wherein the first electrode is capable of vibrating to the second substrate, and any one of the first electrode and the second electrode includes a film retaining electric charges, and the vibration power generator further comprises a third electrode including a film retaining electric charges arranged on the first substrate, and a fourth electrode including a film retaining electric charges arranged on the second substrate, and wherein the third electrode and the fourth electrode are arranged so that the first substrate is retained at a predetermined position when an external force does not acts on the first substrate, while an electrostatic force capable of returning the first substrate to a predetermined position acts when an external force acts on the first substrate and the first substrate moves with respect to the second substrate.

In an aspect 2, the present invention provides the vibration power generator according to the aspect 1, wherein a film retaining the electric charges included in any one of the first electrode or the second electrode, a film retaining electric charges included in the third electrode, and a film retaining electric charges included in the fourth electrode retain electric charges with the same polarity.

In an aspect 3, the present invention provides the vibration power generator according to the aspect 1 or 2, further including a regulating member defining an amplitude of the vibration of the first substrate, wherein the third electrode is arranged in the vicinity of an end face of the first substrate, and the fourth electrode is arranged in the vicinity of an end face of the second substrate, and at a position so that the third electrode and the fourth electrode do not overlap even when the first substrate causes the vibration.

In an aspect 4, the present invention provides the vibration power generator according to the aspect 1 or 2, further including a regulating member defining an amplitude of the vibration of the first substrate, wherein the third electrode is arranged at the center of the first substrate, and the fourth electrode is arranged at the center of the second substrate, and at a position so that the third electrode and the fourth electrode do not overlap even when the first substrate causes the vibration.

In an aspect 5, the present invention provides the vibration power generator according to any one of the aspects 1 to 4, further comprising a projection having one end fixed on the second substrate, and the other end contacted with the first substrate thereby electrically connecting to the first substrate.

In an aspect 6, the present invention provides the vibration power generator according to the aspect 5, further comprising a third substrate facing an opposite surface of the first substrate facing the second substrate, and separated from the first substrate, and a second projection having one end fixed on the third substrate, and the other end contacted with the first substrate thereby electrically connecting to the first substrate.

In an aspect 7, the present invention provides the vibration power generator according to the aspect 6, wherein the third substrate is supported by a support formed on the second substrate, and the support defines an amplitude of the vibration of the first substrate.

In an aspect 8, the present invention provides the vibration power generator according to any one of the aspects 5 to 7, wherein the first electrode and the third electrode are composed of a first film retaining electric charges formed on the first substrate, and an insulating material formed to cover the first film.

In an aspect 9, the present invention provides the vibration power generator according to the aspect 1 or 2, further comprising a third substrate spaced from the first substrate and opposite to one surface of the first substrate, a fifth electrode arranged on the one surface of the first substrate, and a sixth electrode arranged on the third substrate so as to face the fifth electrode, wherein the first substrate vibrates respect to the third substrate, the second substrate faces the other surface of the first substrate, the first electrode and the third electrode are arranged on the other surface of the first substrate, and any one of the fifth electrode and the sixth electrode includes a film retaining electric charges.

In an aspect 10, the present invention provides the vibration power generator according to the aspect 9, further comprising a seventh electrode arranged on the one surface of the first substrate and including a film retaining electric charges, and an eighth electrode arranged on the third substrate and including a film retaining electric charges, wherein the seventh electrode and the eighth electrode are arranged so that the first substrate is retained at a predetermined position when an external force does not acts on the first substrate, while an electrostatic force capable of returning the first substrate to a predetermined position acts when an external force acts on the first substrate and the first substrate moves with respect to the second substrate.

In an aspect 11, the present invention provides the vibration power generator according to the aspect 10, wherein a film retaining the electric charges included in one of the fifth electrode or the sixth electrode, a film retaining the electric charges included in the seventh electrode, and a film retaining the electric charges included in the eighth electrode retain electric charges with the same polarity.

In an aspect 12, the present invention provides the vibration power generator according to the aspect 10 or 11, comprising two pairs of the third electrode and the fourth electrode and two pairs of the seventh electrode and the eighth electrode, wherein two pairs of the third electrode and the fourth electrode are arranged so that a component parallel to the first substrate of an electrostatic force acting between electrodes of one pair of the third electrode and the fourth electrode, and a component parallel to the first substrate of an electrostatic force acting between electrodes of the other pair of the third electrode and the fourth electrode face an opposite direction; and wherein two pairs of the seventh electrode and the eighth electrode are arranged so that a component parallel to the first substrate of an electrostatic force acting between electrodes of one pair of the seventh electrode and the eighth electrode, and a component parallel to the first substrate of an electrostatic force acting between electrodes of the other pair of the seventh electrode and the eighth electrode face an opposite direction.

In an aspect 13, the present invention provides the vibration power generator according to any one of the aspects 9 to 12, further comprising a projection having one end fixed to the second substrate or the third substrate, and the other end capable to contacting with the first substrate.

In an aspect 14, the present invention provides the vibration power generator according to any one of the aspects 10 to 13, wherein the first electrode includes a film retaining the electric charges, the second electrode includes a film retaining the electric charges, and the first electrode, the second electrode, the third electrode and the seventh electrode include respectively an insulating material covering a film retaining electric charges formed on the first substrate, and a film retaining the electric charges.

In an aspect 15, the present invention provides a vibration power generating device comprising the vibration power generator according to any one of the aspects 1 to 14, and a rectifier circuit rectifying an AC output voltage from the vibration power generator thereby converting the AC output voltage into a DC voltage.

In an aspect 16, the present invention provides the vibration power generating device according to the aspect 15, further comprising a voltage conversion circuit converting the DC voltage output from the rectifier circuit to be a predetermined voltage level, an electric storage circuit storing electric power generated by the vibration power generator in the case where an output from the vibration power generating device is unnecessary, a voltage control circuit controlling an output voltage from the voltage conversion circuit or the electric storage circuit to be a predetermined voltage, and an output switching circuit switching an output of the voltage conversion circuit to the electric storage circuit, or to the voltage control circuit.

In an aspect 17, the present invention provides a communication device using the vibration power generating device according to the aspect 15 or 16.

In an aspect 18, the present invention provides a communication device comprising the vibration power generator according to any one of the aspects 1 to 14, and a battery.

In an aspect 19, the present invention provides an electronic device using the electrical generating device according to the aspect 15 or 16.

In an aspect 20, the present invention provides an electronic device comprising the vibration power generator according to any one of the aspects 1 to 14, and a battery.

According to the vibration power generator of the present invention, since it is possible to operate a substrate at a large amplitude even in low frequency external vibration, for example, about several Hz, electrical generation can be performed by vibration at a low frequency region.

Also, according to the vibration power generator of the present invention, it is possible to eliminate mechanical springs accompanying elastic deformation using a spring structure operated by an electrostatic force. Therefore, it is possible to improve mechanical reliability without requiring a complicated structure and process.

Furthermore, according to the vibration power generating device of the present invention, it is possible to stabilize an output voltage by providing an electric storage circuit.

Furthermore, according to the vibration power generator of the present invention, and the communication device and the electronic device using the vibration power generating device, it is possible to decrease the number of maintenance works such as battery exchanges, and thus a large utilization effect is exerted.

DETAILED DESCRIPTION OF INVENTION

Embodiments of the present invention will be described in detail with reference to the accompanying drawings. In the following description, terms showing a specific directions and positions (for example, upper, lower, right, left and other terms including the terms) are optionally used. Those terms are used for easier understanding of the inventions with reference to the accompanying drawings, and the scope of the present invention is not limited by meanings of those terms. The portion of the same symbol in a plurality of drawings denotes the identical portion or member.

1. First Embodiment

Figure 1:
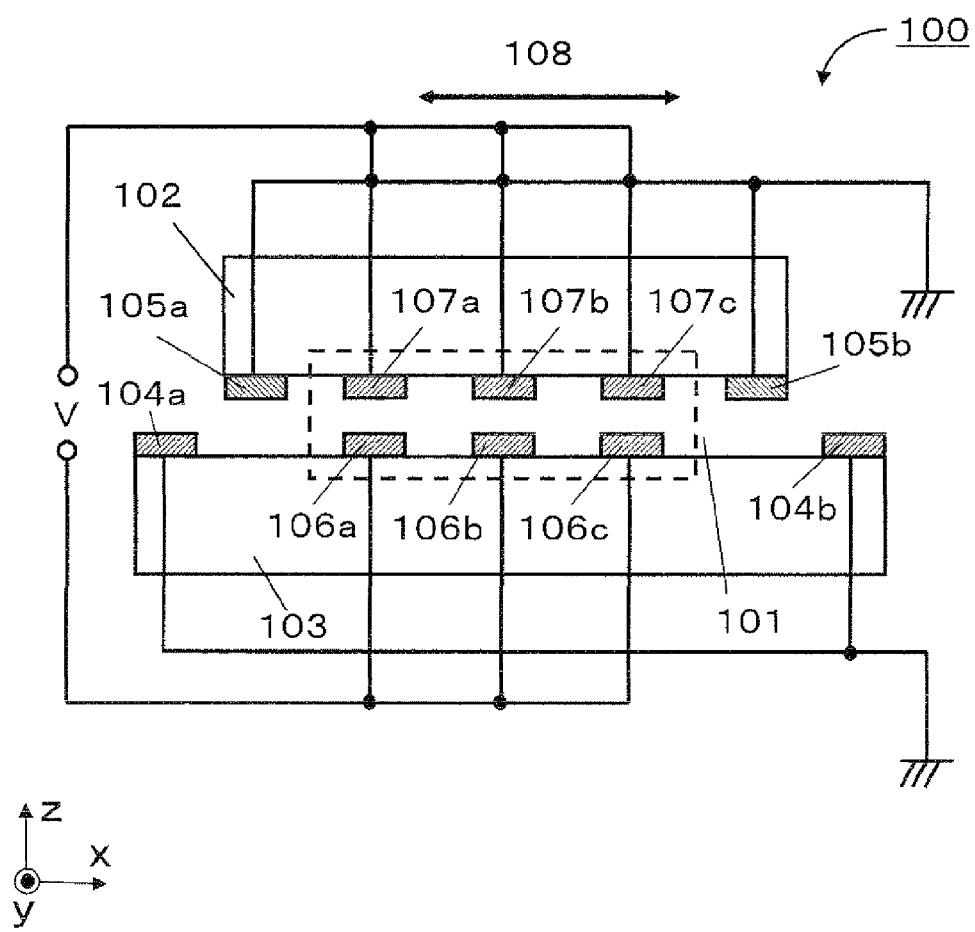
FIG. 1 is a cross-sectional view showing a vibration power generator according to a first embodiment of the present invention.
Figure 2:
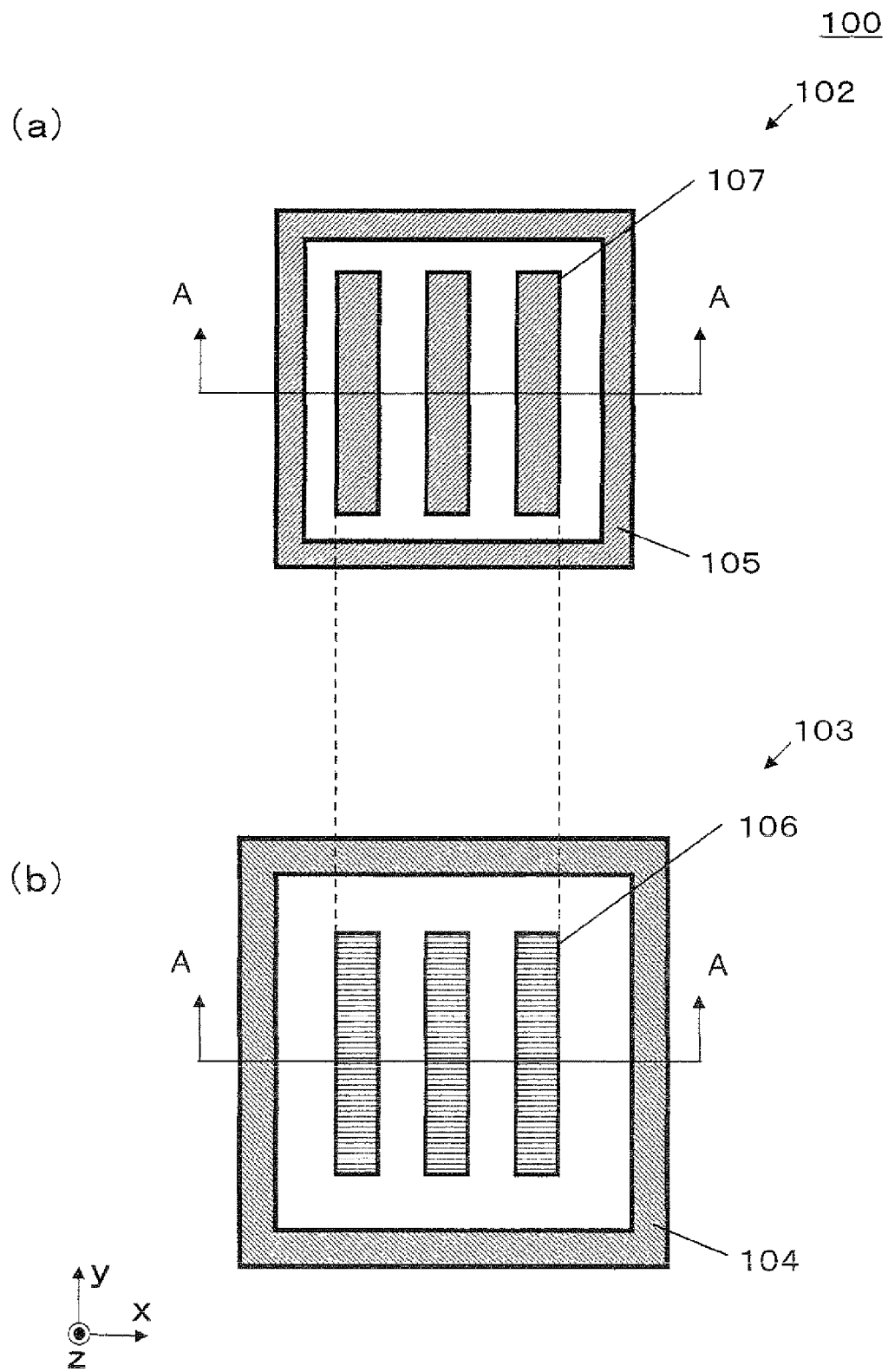
FIG. 2 is a top view showing a first substrate and a second substrate according to the first embodiment of the present invention.

FIG. 1 is a cross-sectional view showing a vibration power generator 100 according to a first embodiment of the present invention, and FIG. 2 is a top view showing a first substrate 102 (FIG. 2(a)) of the vibration power generator 100 and a second substrate 103 (FIG. 2(b)) of FIG. 1. A cross section shown in FIG. 1 corresponds to a cross section taken along line A-A of FIG. 2.

The vibration power generator 100 is composed of the first substrate 102 and the second substrate 103. On the first substrate 102 (lower surface in FIG. 1), first electrodes 107a, 107b, 107c are formed. On the second substrate 103 (upper surface in FIG. 1), second electrodes 106a, 106b, 106c are formed at the positions facing the respective first electrodes 107a, 107b, 107c.

On the first substrate 102, third electrodes 105a, 105b are formed. On the second substrate 103, fourth electrodes 104a, 104b are further formed.

The first electrodes 107a, 107b, 107c, third electrodes 105a, 105b and fourth electrodes 104a, 104b are elecret electrode including a film retaining electric charges. It is preferred that polarity of electric charges retained by the films of the third electrodes 105a, 105b and polarity of electric charges retained by the films of the fourth electrodes 104a, 104b are the same (that is, when one is positive, the other one is also positive, whereas, when one is negative, the other one is also negative) so that a repulsive electrostatic force (repulsive force) acts between the third electrodes and fourth electrodes.

It is preferred that, also regarding polarity retained by the films of the first electrodes 107a, 107b, 107c, a polarity of electric charges retained by the films of the third electrodes 105a, 105b and polarity retained by the films of electric charges of the fourth electrodes 104a, 104b are the same. This is because the first electrodes 107a, 107b, 107c, third electrodes 105a, 105b and fourth electrodes 104a, 104b can be electrically charged at the same time, and thus the process becomes simple Not shown in FIG. 1, the second substrate 103 is fixed, while the first substrate 102 is not fixed. Therefore, the first substrate 102 can move in a z-axis direction, and in at least one direction of an x-axis direction and a y-axis direction.

Since the third electrodes 105a, 105b and fourth electrodes 104a, 104b retain electric charges with the same polarity, an electrostatic repulsive force acts between the third electrodes 105a, 105b and fourth electrodes 104a, 104b. At this time, the strength of the electrostatic repulsive force varies depending on a relative position of the first substrate 102 and second substrate 103. The electrostatic repulsive force can be decomposed in a crosswise direction in FIG. 1 (x direction in FIG. 1) among directions parallel to a main surface of the second substrate 103, a direction perpendicular to a main surface of the second substrate 103 (z-axis direction in FIG. 1), and a direction perpendicular to a paper surface in FIG. 1 (y-axis direction in FIG. 1) among directions parallel to a main surface of the second substrate 103. At this time, in the first embodiment, the first substrate 102 is retained by a z-axis direction component of an electrostatic repulsive force through a space (retained in a state of floating in air).

A feature of the present embodiment is that third electrodes 105a, 105b and fourth electrodes 104a, 104b are arranged so that when the first substrate 102 moves with respect to the second substrate 103 by (acting of an external force, for example) in at least one of an x-axis direction or a y-axis direction (that is, a direction parallel to a main surface of the first substrate 102), a force of (restoring force) returning to an original position (predetermined position) is generated by at least one of an x-axis direction component or a z-axis direction component of an electrostatic force (electrostatic repulsive force).

That is, when the first substrate is retained at a predetermined position of the z-axis direction by an electrostatic force acting between third electrodes 105a, 105b and fourth electrodes 104a, 104b, and also when the external force does not act, the first substrate is also retained at a predetermined position in an x-axis direction and/or a y-axis direction (direction parallel to a main surface of the first substrate 102).

In this way, the arrangement of third electrodes 105a, 105b and fourth electrodes 104a, 104b enables the first substrate 1 to vibrate in an x-axis direction and/or a y-axis direction without using mechanical springs. As a result, the overlapping area between first electrodes 107a, 107b, 107c and second electrodes 106a, 106b, 106c varies and thus the vibration power generator 100 performs electrical generation.

Next, the electrode arrangement will be described.

In the example of the electrode arrangement shown in FIG. 2, the first electrode 107 (107a, 107b, 107c in FIG. 1) are composed of a plurality of strip-shaped electrodes whose longitudinal direction arranged parallel to the y-axis, and the plurality of electrodes are also constituted by electrically connected to each other. Similarly, the second electrodes 106 (106a, 106b, 106c in FIG. 1) are also composed of a plurality of strip-shaped electrodes whose longitudinal direction arranged parallel to the y-axis, and the plurality of electrodes are also constituted by electrically connected to each other. FIG. 2 does not show a wiring structure for easy understanding. The third electrodes 105 (105a, 105b in FIG. 1) and the fourth electrodes 104 (104a, 104b in FIG. 1) are respectively arranged along the entire periphery (end) (along the periphery) of the first substrate 102 and the second substrate 103. They are arranged so that the fourth electrode 104 exists outside the third electrode 105 when the first substrate 102 and the third substrate 103 are allowed to face with each other. However, the arrangement is not limited to this arrangement, and the same effect can be obtained even when they are arranged so that the third electrode 105 exists outside the fourth electrode 104.

As is apparent from FIG. 2, third electrodes 105a, 105b shown in FIG. 1 are a part (portion parallel to a y-axis direction) of the third electrodes 105 arranged surrounding the first electrodes 107, and the third electrodes 105a, 105b are constituted by electrically connected to each other and ground-contacted. Similarly, the fourth electrodes 104a, 104b are also a part (portion parallel to a y-axis direction) of the fourth electrodes 104 arranged surrounding the second electrodes 106, and the fourth electrodes 104a, 104b are constituted by electrically connected to each other and ground-contacted.

The operation of the vibration power generator 100 will be described.

As described above, since the third electrode 105 and the fourth electrode 104 include electric charges with the same polarity, a repulsive force (electrostatic repulsive force) by an electrostatic force acts therebetween. Therefore, when an external force does not act on the first substrate 102, the first substrate 102 is retained at a predetermined position. That is, regarding the z-axis direction, the substrate 102 floats and stays at the position where this repulsive force and gravity acting on the first substrate 102 are balanced. Regarding the x-axis direction, the first substrate 102 stays in the positive where a repulsive force acting (force acting in a right direction of FIG. 1) between the third electrodes 105a and fourth electrodes 104a and a repulsive force acting (force acting in a left direction of FIG. 1) between the third electrodes 105b and the fourth electrodes 104b are balanced. Also regarding the y-axis direction, the first substrate 102 stays at the position where the repulsive force is balanced.

When vibration (external force) is applied from the outside, the first substrate 102 relatively displaces (moves) with respect to the second substrate 103. For example, the case where vibration in the x-axis direction is imparted will be descried. When the first substrate 102 displaces toward the right side by vibration from the position where the above repulsive force is balanced, a repulsive force acting between the third electrodes 105b and fourth electrodes 104b becomes more than a repulsive force acting between the third electrodes 105a and the fourth electrode 104a, and thus a force of returning in the left direction acts on the first substrate 102. In contract, when the first substrate 102 displaces toward the left side from the position where the repulsive force is balanced, a force of returning in the right direction acts on the first substrate 102. In this way, a force of pushing back in a direction opposite to the displaced direction (restoring force) is generated in the first substrate 102, and thus the first substrate 102 can be returned to the original position. The displacement of the first substrate 102 with respect to the second substrate 103 utilizing this restoring force brings about increase and decrease of the overlapping area between the first electrodes 107a, 107b, 107c and second electrodes 106a, 106b, 106c. The increase and decrease of the overlapping area brings about increase and decrease of the amount of electric charges to be induced to the second electrodes 106 (106a, 106b, 106c). The electrical generation is performed by extracting the electric charges as electrical energy. As long as the first substrate 102 continues vibrating in which it is relatively displaced by receiving vibration from the outside and returns to the original position by an electrostatic force, the increase and decrease of the overlapping area is continued.

When vibration in the y-axis direction is imparted to the first substrate 102, similarly, the vibration power generator 100 can perform electrical generation through a restoring force acted by an electrostatic force between the third electrodes 105 and the fourth electrodes 104.

As shown in FIG. 2, since the first electrodes 107 and the second electrodes 106 are composed of a plurality of strip-shaped electrodes whose longitudinal direction is arranged parallel to the y-axis, even when the amount of displacement of the first substrate 102 is the same, the increase and decrease of the overlapping area between the first electrodes 107 and second electrodes 106 becomes not so much as the case where the first substrate 101 vibrates in the x-axis direction.

As shown in FIG. 1, the first electrodes 107 (107a, 107b, 107c) are preferably ground-contacted for the following reason. That is, ground-contacting enables a potential corresponding to a charge storage amount with reference to the standard potential of GND to appear on a surface of the first electrodes 107 (107a, 107b, 107c), and thus an electrical generation voltage caused by vibration can be stabilized.

According to the vibration power generator 100 of the present embodiment, the following effects can be obtained.
(1) Electrical generation can be performed even by low frequency vibration
(2) Improvement in mechanical reliability The item (1) will be described in detail. The first substrate 102 and the second substrate 103 do not include a mechanical elastic structural body existing in a conventional structure and utilizes a spring force by an electrostatic force and is not limited by a resonance frequency determined by size, material property and the like of the elastic structural body, and thus enabling electrical generation even by vibration in a low frequency region.

When the mass of the first substrate 102 is regarded as m for simplification, assuming that a force F=ma is applied by acceleration a of external vibration, the first substrate 102 performs displacement by a force F. Also, lateral unbalance of an electrostatic force is generated by the amount of displacement, whereby, a force is applied so as to return to the original position. In this way, the amount of displacement of the first substrate 102 of the vibration power generator 100 shown in the present embodiment depends on acceleration, and thus enabling electrical generation even by vibration in a low frequency region.

The item (2) will be described in detail.

The vibration power generator 100 shown in the present embodiment does not include a mechanical elastic structural body existing in a conventional structure. Therefore, there is no position where elastic fatigue arises, which is caused by a problem such as difficulty of miniaturization by performing designing with sufficient allowance to ensure reliability against an elastic strain of the elastic structural body in the structure. As a result, it is easy to endure mechanical reliability in the spring portion, to downsize and to ensure reliability when an operation at a large amplitude is performed. It is not necessary to form a member made of a quite different material, like a substrate made of silicon, glass and the like, and resin springs. Therefore there is an advantage that the structure and process are not complicated.

Figure 3:
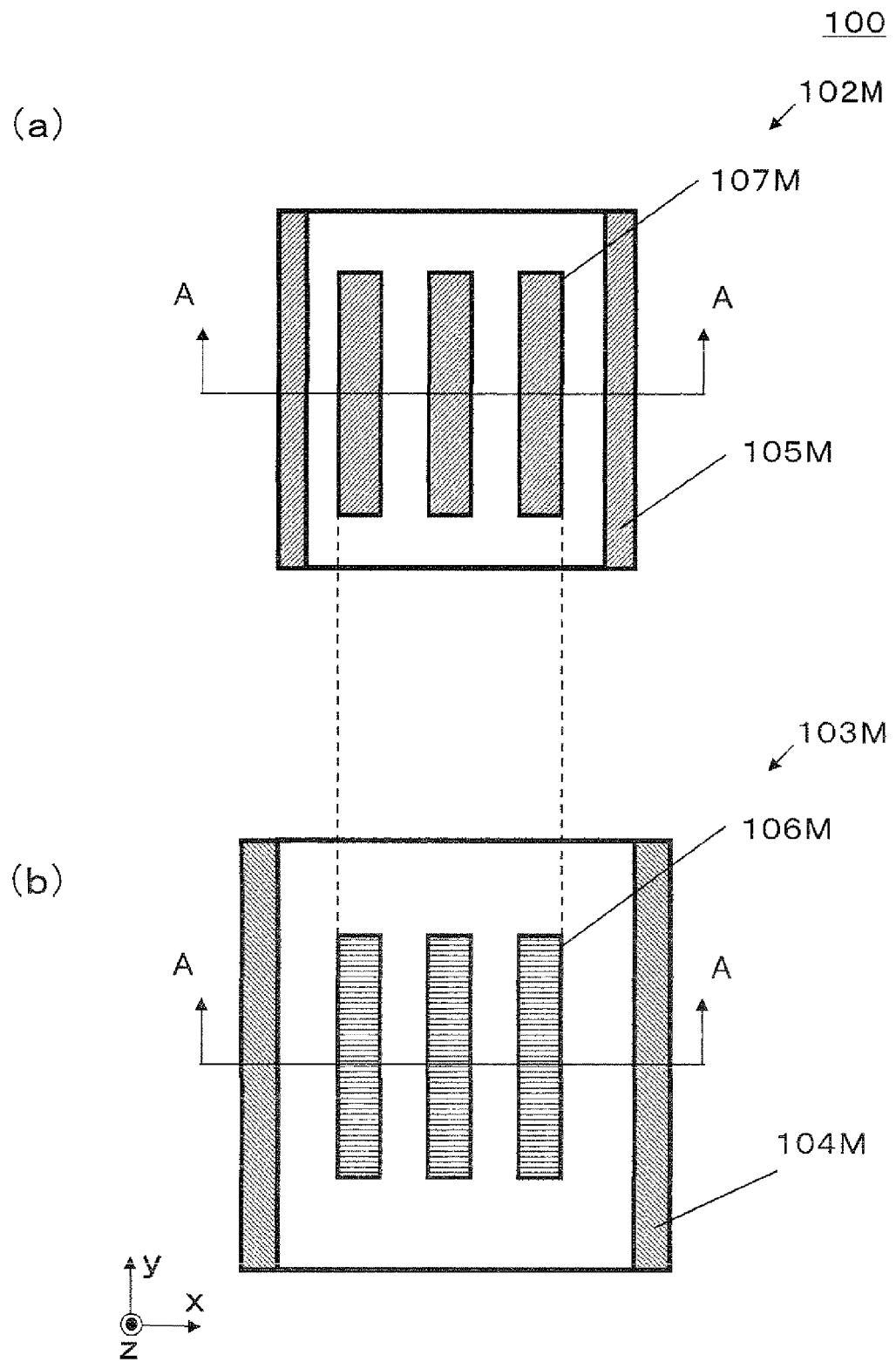
FIG. 3 is a top view showing another first substrate and second substrate according to the first embodiment of the present invention.

FIG. 3 is a top view showing a first substrate 102M (FIG. 3(a)) and a second substrate 103M (FIG. 3(b)) according to variation of the present embodiment.

In the above first substrate 102, third electrodes 105 are arranged along the periphery of the substrate over the entire periphery, whereas, the first substrate 102M of the variation is different in that third electrodes (electret electrode) 105M are arranged only along the periphery (end portion) extending in the y-axis direction.

Similarly, the second substrate 103M is also different from the above second substrate 103 in that fourth electrodes (electret electrodes) 104M are only arranged along periphery (end portion) extending in the y-axis direction.

In the x-axis direction, the fourth electrodes 104M are arranged so that they exist outside the third electrodes 105M.

The portion other than the third electrodes 105M of the first substrate 102M may be the same as those of the first substrate 102 and, for example, the first electrodes 107M may be the same as the above mentioned first electrodes 107. Similarly, the portion other than the fourth electrodes 104M of the second substrate 103M may be the same as those of the second substrate 103 and, for example, the second electrodes 106M may be the same as the above mentioned second electrode 106.

Two third electrodes 105M shown in FIG. 3(*a*) are electrically connected to each other and ground-contacted, and two fourth electrodes 106M shown in FIG. 3(*b*) are also electrically connected to each other and ground-contacted.

By making polarity of electric charges retained by a film of the third electrodes 105M identical to polarity of electric charges retained by a film of the fourth electrodes 104M, an electrostatic force (repulsive force) acts between the third electrodes 105M and the fourth electrodes 104M. Therefore, the first substrate 102M floats in the z-axis direction and, when an external force (vibration) is applied in the x-axis direction, a restoring force of returning to the original position acts, and thus enabling vibration in the x-axis direction. Therefore, it becomes possible to perform electrical generation in a vibration power generator including the first substrate 102M and the second substrate 103M.

In other words, the first substrate 102M is retained in the z-axis direction at a predetermined position by an electrostatic force between the third electrodes 105M and the fourth electrodes 104M and, when an external force does not act, the first substrate is also retained at a predetermined position in the x-axis direction.

In the vibration power generator including the first substrate 102M and the second substrate 103M, a restoring force is not generated even when vibration (external force) in the y-axis direction is applied, unlike the above vibration power generator 100. Therefore, in order to limit the displacement of the first substrate 102 in the y-axis direction within a predetermined range, restriction means by projections and the like is preferably provided.

The first substrate 102M has such an advantage that the third electrodes 105M may be only arranged on a portion of the periphery, not the entire periphery and, similarly, in the second substrate 103M, the electrodes 104M may be only arranged on a portion of the periphery, not the entire periphery, and thus the structure becomes simple.

In the embodiment shown in FIG. 3, the fourth electrodes 104M are arranged so that they exist outside the third electrodes 105M in the x direction, while the third electrodes 105M may be arranged so that they exist outside the fourth electrodes 104M.

In the embodiment shown in FIG. 3, the third electrodes 105M and the fourth electrodes 104M are respectively arranged on the entire periphery (end portion) extending in the y-axis direction of the substrate over which they have been arranged. For example, they may be arranged only at corner portions (four corners) of the substrate, or may be arranged only at a position apart from the corner portions.

(Electret Electrode)

Electrodes (electret electrodes) including a film retaining electric charges used in the first embodiment will be described in detail below.

Figure 4:
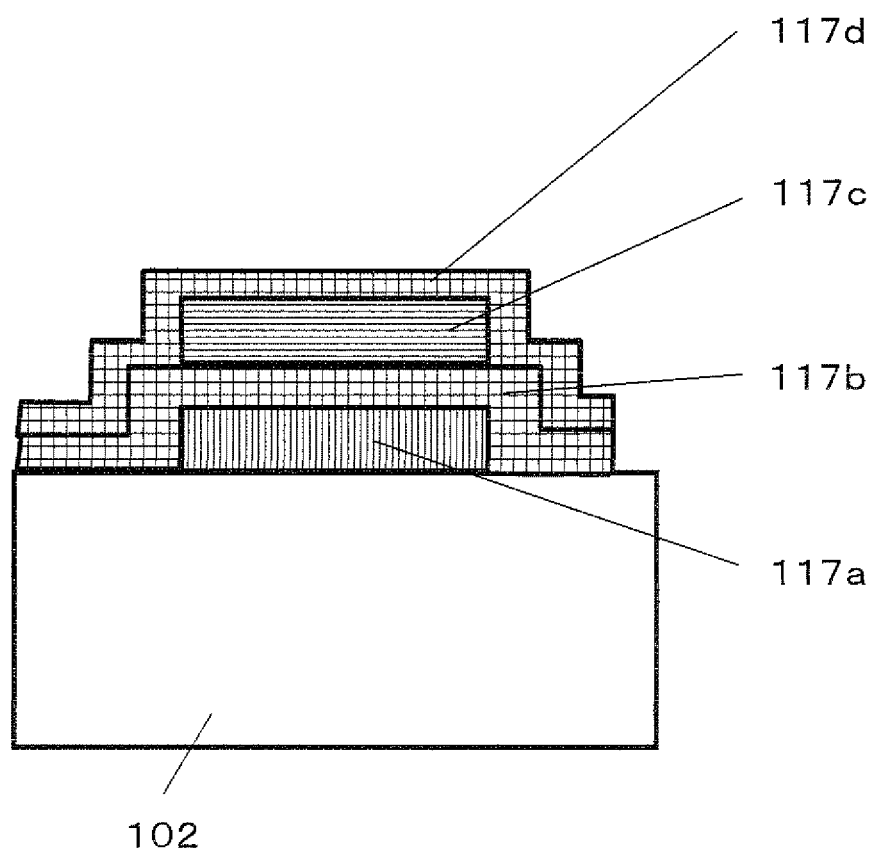
FIG. 4 is a cross-sectional view showing an elecret electrode according to the first embodiment of the present invention.

FIG. 4 is a cross-sectional view showing any one of first electrodes 107*a*, 107*b*, 107*c* and third electrodes 105*a*, 105*b*.

On a first substrate 102, a conductor 117*a* is formed. A first insulating material 117*b*, an electret 117*c* as a film retaining electric charges, and a second insulating material 117*d* are formed at the upper side of the conductor 117*a*.

By way of first electrodes 107 (107*a*, 107*b*, 107*c*) as an example, the conductor 117*a* of the first electrodes 107*a*, 107*b*, 107*c* is electrically connected.

The electret may be formed on the entire conductor 117*a* or may be arranged only at a portion on the strip-shaped conductor 117, but is preferably formed on a part of the strip-shaped conductor 117*a* from the viewpoint of the process, and stability of device characteristics It is particularly preferred to use a high-resistance substrate as the first substrate 102. In this case, it is desired that the electret 117*c* is formed only on the conductor 117*a*. By forming in such way, in the case of injecting electric charges, it becomes possible to forcibly inject electric charges into the electret 117*c* and to produce the electret with more stable electric charges.

As used herein, the high-resistance substrate includes not only a substrate having entirely high resistivity, but also a substrate in which an insulation film such as oxide film is formed on a surface of a low-resistance substrate (for example, low-resistance silicon substrate). As a matter of course, the same effect as that of the former can be obtained even when the latter is used.

Next, an electret material used in an electret 117*c* will be described.

As described above, first electrodes 107, third electrodes 105 and fourth electrodes 104 include an electret film retaining electric charges. It is possible to use, as an electret material constituting the electret film 117*c*, polymeric materials such as polypropylene, polyester terephthalate and polyvinyl chloride, or inorganic materials such as silicon oxide. It is preferred to use silicon oxide having excellent dielectric voltage (or insulating property) and heat resistance, among these materials.

In order to improve moisture resistance, it is preferred to have a structure in which the periphery of silicon oxide is completely coated with an insulation film such as a silicon nitride film. For example, in the case of using silicon oxide, it becomes possible to obtain an electret 117*c*, which is excellent in dielectric voltage and heat resistance, and is also excellent in moisture resistance, by having a structure in which the periphery of silicon oxide is completely coated with an insulation film such as a silicon nitride film.

In FIG. 4, examples of the first electrodes 107*a*, 107*b*, 107*c* and the third electrodes 105*a*, 105*b* are shown. As a matter of course, the fourth electrodes 104*a*, 104*b*, and the first electrodes 107M, third electrodes 105M and fourth electrodes 104M according to variation may have the same structure.

In the present embodiment, the example, in which the first electrodes 107*a*, 107*b*, 107*c* are electret electrodes retaining electric charges, and the second electrodes 106*a*, 106*b*, 106*c* are conventional electrodes, is shown. However, the electret electrodes retaining electric charges may be second electrodes 106*a*, 106*b*, 106*c*, and the first electrodes 107*a*, 107*b*, 107*c* may be conventional electrodes and, as a matter of course, the same effect is also obtained in this case.

Furthermore, the present embodiment has the constitution in which the second substrate 103 is fixed and is not capable of vibration. The second substrate 103 may be not fixed and be a vibratable (movable) structure, like the first substrate 102.

Not shown in FIG. 1, FIG. 2 and FIG. 4, the first insulating material 117b and the second insulating material 117d are formed so that the conductor 117a can be electrically connected to an external terminal. The first insulating material 117b and the second insulating material 117d may be formed so as to cover at least the electret 117c, and it is not necessary that the first insulating material 117b and the second insulating material 117d are formed on entire surface of the substrate.

In the present embodiment, the second electrodes 106 are formed in the same form as that of the first electrodes 107. However, it is preferred that the second electrodes 106 are formed in the region exceeding the first electrodes 107 (formed outside the first electrodes 107). More preferably, a second electrode region is formed up to a vibration limit of the first electrodes 107 (range where the displacement can be performed by vibration).

The following effects can be obtained by constituting the second electrodes 106 in this way.

(3) Constant overlapping area can be achieved.

When second electrodes 106 are formed at the position generally opposed to first electrodes 107 in a resting state, in case the substrate 102 vibrates at a large amplitude (large displacement), the time during which the first electrodes 107 (particularly, first electrodes 107a, 107c locate at the end) and second electrodes 106 do not overlap increases, thus causing a problem that the increase and decrease of the overlapping area decrease.

However, it is possible to prevent the increase and decrease of the overlapping area from lowering by forming the second electrodes 106 in the region larger that of the first electrode 107 (forming outside the first electrode), and thus it is possible to always maintain the increase and decrease of the overlapping area constant. That is, it is possible to stabilize the amount of electrical generation of the vibration power generator 100.

Especially, the constitution of the second electrode 106 results in a high advantageous effect to the vibration power generator, which can increase the amplitude of the first substrate 107, thereby exceeding a width of the first or second electrodes, like the structure using an electrostatic force shown in the present embodiment.

Furthermore, even when a shape of a surface (main surface) of the first substrate 102 may be, in addition to a square shown in FIG. 2, rectangle, or other shapes, the same effects can be obtained by adopting the arrangement of electrodes for electrical generation (first and second electrodes) and electrodes for generation of an electrostatic force (third electrode 105, fourth electrode 104) shown in the present embodiment, as a matter of course.

2. Second Embodiment

Figure 5:
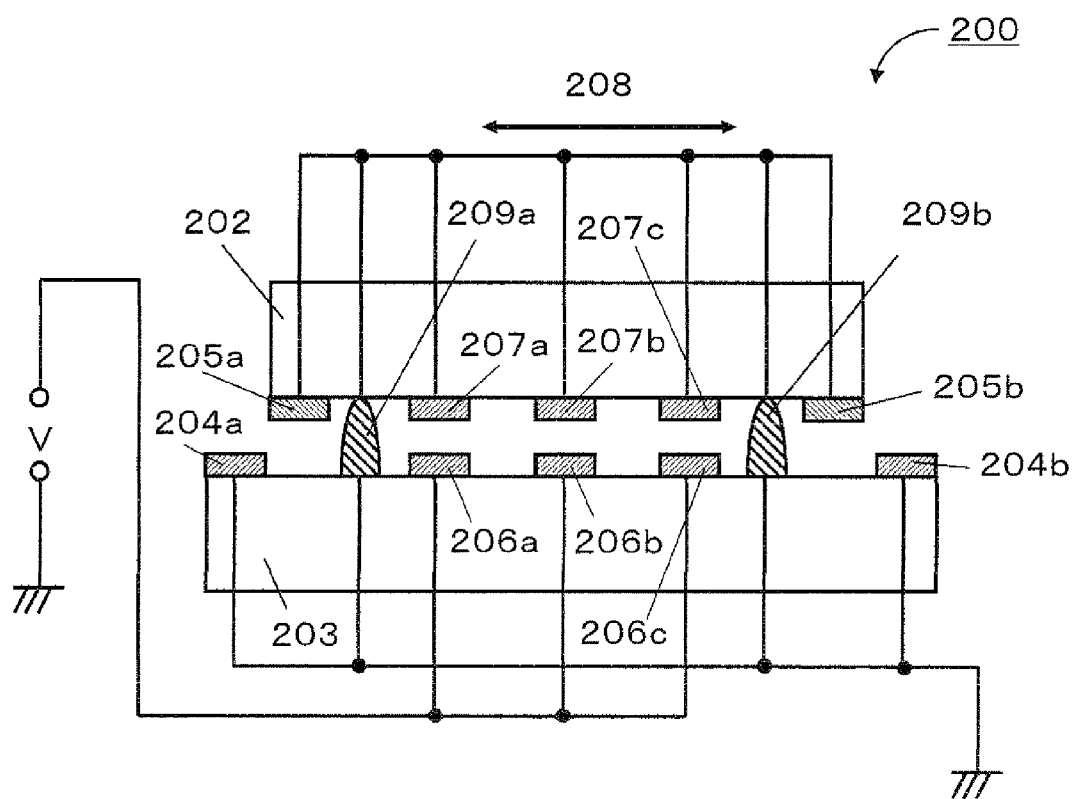
FIG. 5 is a cross-sectional view showing a vibration power generator according to a second embodiment of the present invention.
Figure 5:
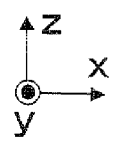

FIG. 5 is a cross-sectional view showing a vibration power generator 200 according to the second embodiment of the present invention. The vibration power generator of the second embodiment is different from that of the first embodiment in that first projections 209a, 209b are formed between a first substrate 202 and a second substrate 203.

The reference symbols with numerals of the 200 mark are used for the respective components shown in FIG. 5 so as to clarify that they are components according to the present embodiment. Unless otherwise specified, the respective components may be identical to the corresponding components of the first embodiment denoted by the same reference symbols except for numerals of the 100 mark.

The projections 209a, 209b have one end fixed to one of the first substrate 202 and the second substrate 203, and the other end contacted with the other one of the first substrate 202 and the second substrate 203 without being fixed.

In the embodiment shown in FIG. 5, the projections 209a, 2009b have one end (lower end) fixed to the second substrate 203, and the other end (upper end) contacted with the first substrate 202 without being fixed.

Description will be made based on the embodiment shown in FIG. 5.

The projections 209a, 209b are formed, including a conductor and used for extraction of electrodes.

The vibration power generator 200 performs electrical generation by the displacement of the first substrate 202 with respect to the second substrate 203 as a result of vibration from the outside. In that case, the first substrate 202 undergoes displacement by vibration from the outside and is returned to a predetermined position by an electrostatic force. Similar to the first embodiment, first electrodes 207 (207a, 207b, 207c), third electrodes 205 (205a, 205b) and fourth electrodes 204 (204a, 204b) are electret electrodes retaining electric charges. Unlike the fourth electrodes 204 on the second substrate 203, when the first electrodes 207 and the third electrode 205 on the first substrate are not ground-contacted, a potential of an electric power to be electrically generation can become unstable.

Therefore, the lower end of the projections 209a, 209b is electrically ground-contacted, and the upper ends thereof are electrically connected to the first electrodes 207 and the third electrodes 205.

In order to ensure electrical connection between the upper ends of the projections 209a, 209b, and the first electrodes 207 and the third electrodes 205 even when the first substrate 202 is displaced by vibration, for example, a conductor film is formed on a surface of the first substrate 202 (for example, formed by exposing a conductor of the first electrode 207 corresponding to the conductor 117a shown in FIG. 4) and the upper end portions of the projections 209a, 209b may be contacted and slid on the conductor film.

On the second substrate 203 of the vibration power generator 200, the projections 209a, 209b are formed and the projections are utilized as an electrical wiring and displaced in a state of being contacted with the first substrate 202, whereby, it becomes possible to eliminate unnecessary stress by electrical wiring from the first substrate.

With such constitution, the following effects can be obtained.

(4) Electric extraction from the first substrate 202 can be easily carried out.

The item (4) will be described. It becomes possible to eliminate unnecessary stress by electrical wiring (lead wire, or wire) from the first substrate 202 by providing projections and performing electric extraction through the projections.

Particularly in the vibration power generator 200, which can be operated at a large amplitude, of the present embodiment, it is necessary to ensure wiring length according to the amount of displacement of the first substrate 202.

For example, in the case of extracting using a lead wire, since stress is applied to a contact point between the lead wire and the first substrate at the time of a large amplitude when the lead wire has a short length, it is necessary to make the lead wire sufficiently long. In contrast, when the lead wire is too long, wiring may be sometimes entangled. However, such a problem does not arise in the present embodiment.

It is also possible to support the first substrate 202 by the projections 209a, 209b.

In the first embodiment, it is necessary for an electrostatic force (repulsive force) between third electrodes 105 and fourth electrodes 104 to simultaneously fulfill a function of allowing the first substrate 102 to float in the z-axis direction and a function of returning the first substrate 102 to the original position in the x-axis direction.

However, in the present embodiment, since the projections 209a, 209b can support the first substrate 202, it is not necessary to allow the first substrate 102 to float by an electrostatic force between third electrodes 205 and fourth electrodes 204.

That is, the electrostatic force between third electrodes 205 and fourth electrodes 204 may only have the function of returning the first substrate 202 to the original position in the x-axis direction (function of retaining at a predetermined position when a restoring force and an external force are absent).

This exerts the effect of increasing the size of the third electrodes 205 and the fourth electrodes 204, and the degree of freedom for design of the arrangement and the like.

In the embodiment shown in FIG. 5, a plurality of projections 209a, 209b are arranged and only one projection may be arranged. However, a plurality of projections are preferably arranged and, more preferably, three or more projections are arranged for the following reasons. The first substrate 202 can be stably retained by contacting with the first substrate 202 at three points.

It is possible to electrically connecting the first electrodes 207 and the third electrodes 205 more stably by including a plurality of projections 209a, 209b.

It is possible to stably support the first substrate 202 by arranging three or more projections 209a, 209b.

As described above, the projections 209a, 209b are formed of a conductor. As shown in FIG. 5, the projections 209a, 209b may have a convex structure (for example, shape in which a cross-sectional area (cross-sectional area of a surface parallel to a main surface of the first substrate 202) decreases upward from downward) and may be entirely a conductor. Alternatively, the projections 209a, 209b may be provided with a conductive film formed only on a surface. As a matter of course, the same effects can be obtained even in this case.

Furthermore, the structure of the projections 209a, 209b may be other structures, for example, triangular pyramid, triangular prism and column as long as electric extraction can be performed.

Also in the present embodiment, it is preferred that the second electrodes 206 are formed up to the region that extends over the first electrodes 207 (formed outside the first electrodes 107) and is formed up to a vibration limit of the first electrodes 207 (range where the displacement can be performed by vibration). With such constitution, it is possible to operate even in a large amplitude operation without decreasing the amount of electrical generation, same as the first embodiment.

3. Third Embodiment

Figure 6:
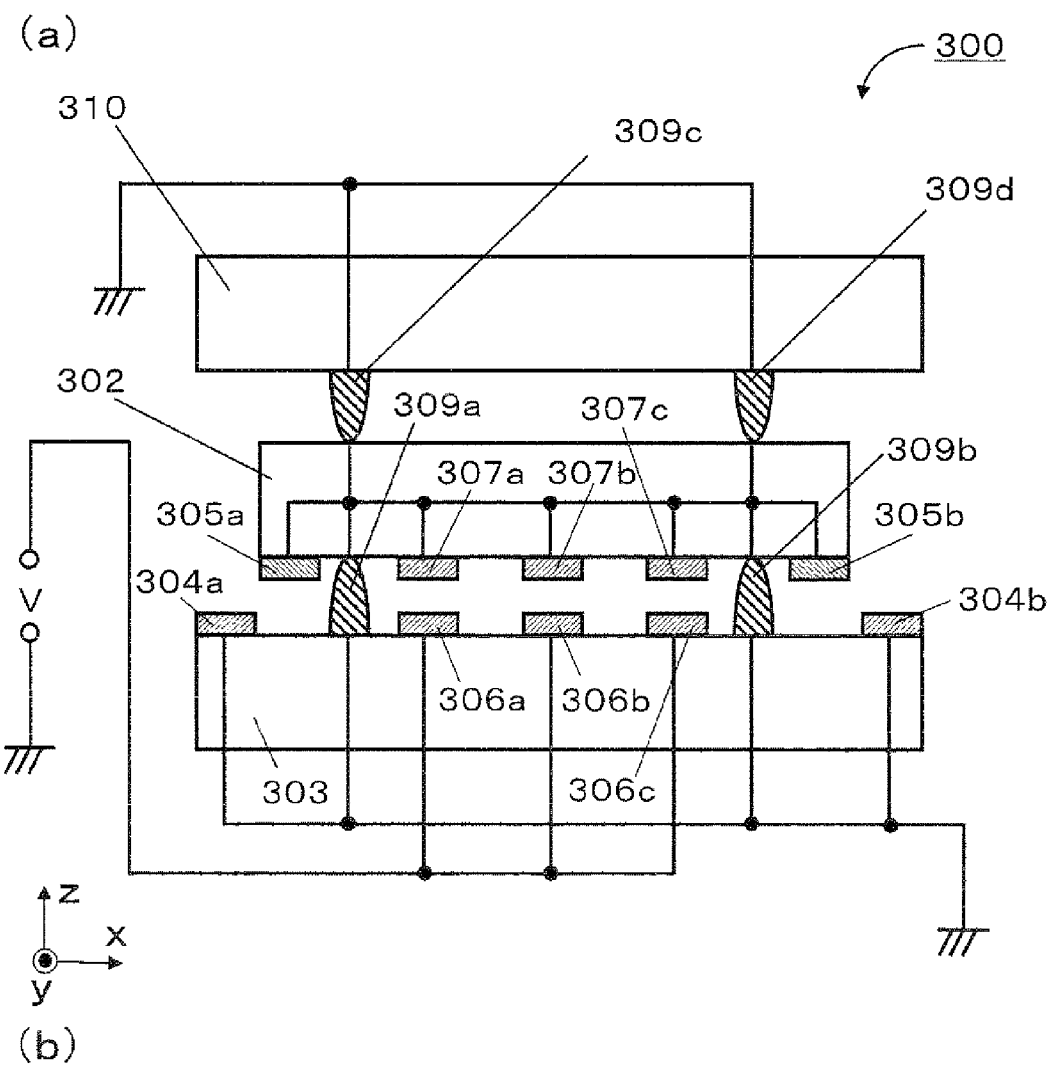
FIG. 6 includes FIG. 6(a) that is a cross-sectional view showing a vibration power generator and FIG. 6(b) that is a cross-sectional view showing a structure of a first electrode, according to a third embodiment of the present invention.
Figure 6:
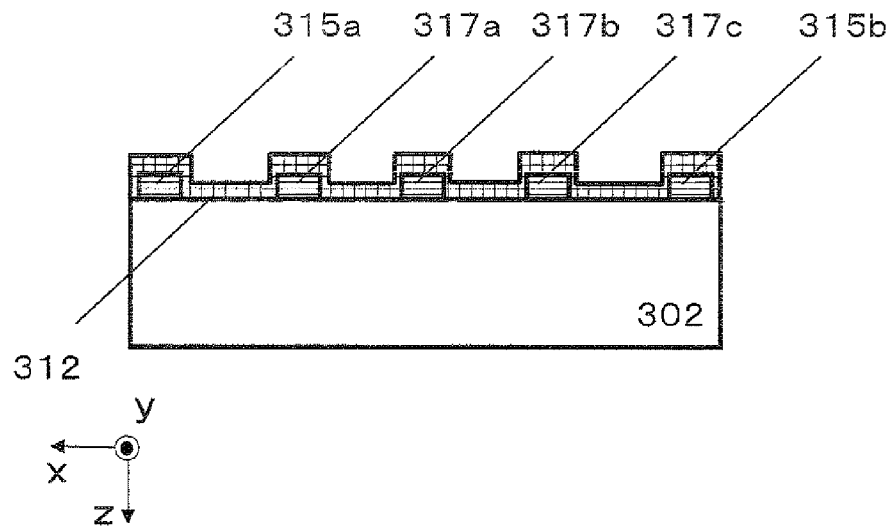

FIG. 6 includes a cross-sectional view (FIG. 6(a)) showing a vibration power generator 300 in a third embodiment of the present invention and a cross-sectional view (FIG. 6(b)) showing a first substrate 302.

The third embodiment is different from the second embodiment in that the vibration power generator 300 includes a third substrate 310 arranged above the first substrate, and second projections 309c, 309d arranged between the third substrate 310 and the first substrate 302.

The reference symbols with numerals of the 300 mark are used for the respective components shown in FIG. 6 so as to clarify that they are components according to the present embodiment. Unless otherwise specified, the respective components may be identical to the corresponding components of the first and second embodiments denoted by the same reference symbols except for numerals of the hundred's digit.

In the present embodiment, similarly to the second embodiment, the vibration power generator is provided, in addition to first projections 309a, 309b having one end portion fixed to the second substrate 303, and the other end portion contacted with a lower surface of the first substrate 302, second projections 309c, 309d having one end portion fixed to the third substrate 310, and the other end portion contacted with an upper surface of the first substrate 302.

By the first projections 309a, 309b and the second projections 309c, 309d, extraction of electrodes (ground-contacting of first electrodes 307 (307a, 307b, 307c) and third electrodes 305 (305a, 305b)) are carried out.

As shown in FIG. 6(b), the first substrate 302 is composed of a silicon substrate having low resistance such as 0.01 Ω·cm or less for electric extraction.

On the lower surface (upper surface in FIG. 6(b)) of the first substrate 302, electrets 315a, 315b of the third electrode 305 are formed along the periphery of the first substrate 302, and electrets 317a, 317b, 317c of the first electrode 307 are formed in a strip shape. Furthermore, an insulating material 312 is formed so as to cover the electrets 315a, 315b, 317a, 317b, 317c.

FIG. 6(b) shows as if the entire lower surface (upper surface in FIG. 6(b)) of the first substrate 302 is covered with an insulating material 312. Actually, the electrets are formed by removing the insulating material 312 in the region contacted with the first projections 309a, 309b, whereby, a low-resistance substrate constituting the first substrate 302 and first projections 309a, 309b are electrically connected.

The operation of the vibration power generator 300 thus formed will be described.

The vibration power generator 300 performs electrical generation by displacing the first substrate 302 with respect to the second substrate 303 and the third substrate 310 by vibration from the outside.

In that case, the first substrate 302 is displaced by vibration from the outside and then returned to a predetermined position by an electrostatic force between the third electrodes 305 (305a, 305b) and the fourth electrodes 304 (304a, 304b).

Similarly to the first embodiment, the first electrodes 307, the third electrodes 305 and the fourth electrodes 304 include electrets, and the first electrodes 307 and the third electrodes 305 on the first substrate 302 are electrically ground-contacted for the following reason. That is, when the electrodes are not ground-contacted, the potential of an electric power obtained by electrical generation can be unstable.

The first projections 309a, 309b arranged on the second substrate 303 and the second projections 309c, 309d arranged on the third substrate 310 are utilized as electrical wirings. By displacing the first substrate 302 in a state where the first projections 309a, 309b and the second projections 309c, 309d are contacted with the substrate 302, it becomes possible to further improve reliability of electrical connection as compared with the second embodiment.

With such constitution, the following effects can be obtained.

(5) Stable electric extraction

The item (5) will be described. As compared with the second embodiment, the second projections 309c, 309d are arranged on the third substrate 310, thereby enabling electric extraction (electrically connection) not only from a downward direction of the first substrate 302, but also from the upward direction. Whereby, it becomes possible to stably displace in a lateral direction (x-axis direction in FIG. 6(a)) when the first substrate 302 is displaced.

Even when the first substrate 302 floats by vibration in a thickness direction (z-axis direction in FIG. 6(a)) and is not contacted with the projections 309a, 309b, it is possible to perform electric extraction from the second projections 309c, 309d existing at the upper portion.

Particularly in case the first substrate 302 is displaced, even when the first substrate 302 is pushed upward (in the z-axis direction) by an electrostatic force in an oblique direction between the third electrodes 305a, 305b and the fourth electrodes 304a, 304b, it becomes possible to support the first substrate 302 by the second projections 309c, 309d arranged at the upper portion of the first substrate 302 and to perform electrical extraction.

The projections 309a, 309b, 309c, 309d are formed of a conductor. At this time, the projections may have a convex structure (for example, shape in which a cross-sectional area (cross-sectional area of a surface parallel to a main surface of the first substrate 302) decreases toward the first substrate 302 from the second substrate 303 or the third substrate 310 to which projections are fixed) as shown in FIG. 6 and may be entirely a conductor. As a matter of course, the same effects can be obtained even when a conductive film is formed only on a surface. Furthermore, the structure of the projections 309a, 309b, 309c, 309d may be other structures as long as electric extraction can be performed.

Also in the present embodiment, it is preferred that the second electrodes 306 are formed up to the region that extends over the first electrodes 307 (formed outside the first electrodes 307) and is formed up to a vibration limit of the first electrodes 307 (range where the displacement can be performed by vibration). With such constitution, it is possible to operate even in a large amplitude operation without decreasing the amount of electrical generation, similarly to the first embodiment.

4. Forth Embodiment

Figure 7:
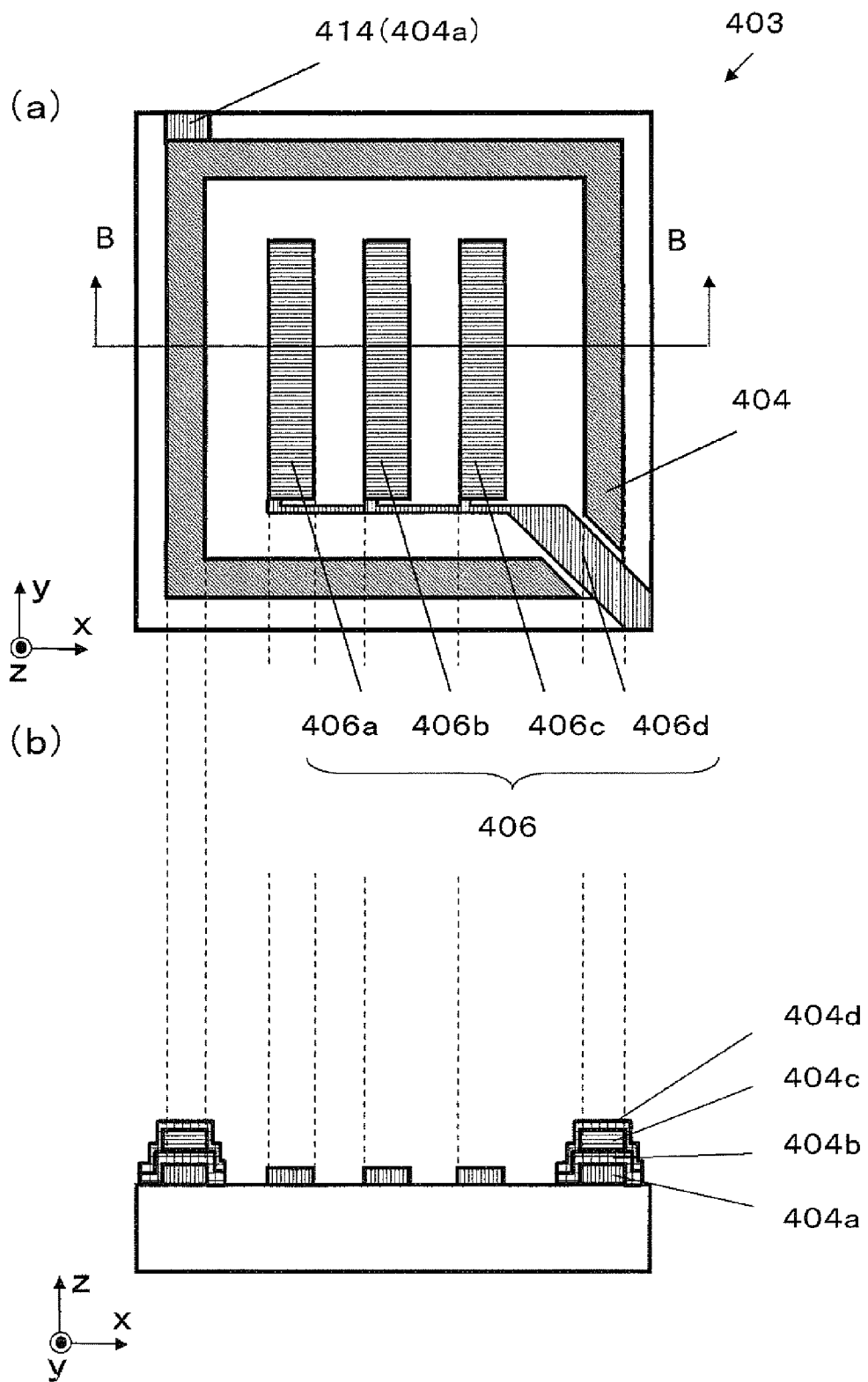
FIG. 7 includes FIG. 7(a) that is a top view showing a second substrate of a vibration power generator and FIG. 7(b) that is a cross-sectional view taken along lines B-B in FIG. 7(a), according to a fourth embodiment of the present invention.

FIG. 7 includes a top view (FIG. 7(a)) showing a second substrate 403 according to a fourth embodiment of the present invention and a cross-sectional view (FIG. 7(b)) taken along lines B-B in the second substrate 403.

In FIG. 7, fourth electrodes 404 are formed on the periphery of the second substrate 403. On the second substrate 403, second electrodes 406 are formed. More specifically, not shown in the drawing, the second electrode 406a, 406b, 406c are formed at the position opposite to the first electrode and electrically connected by a wiring electrode 406d. At this time, a notch is provided at a part of fourth electrodes 404 so that extraction to the outside is performed at least one of four corners of the second substrate 403.

Electrically connection to the fourth electrodes 404 is ground-contacted through an electrode 414 (404a).

Herein, the fourth electrodes 404 are composed of a conductor 404a, a first insulating material 404b, an electret 404c retaining electric charges, and a second insulating material 404d, similarly to FIG. 3.

The operation of a vibration power generator including the second substrate 403 is the same as that of the other embodiment.

By constituting the second substrate 403 in this way, the following effects can be obtained.

(6) It is possible to decrease an influence of an electrostatic force on a spring force.

The item (6) will be described. In the present embodiment, the second electrode 406 is taken out from the end portion of the second substrate 403.

Whereby, even when the first substrate 402 is displaced in the x-axis direction or the y-axis direction, it is possible to return the first substrate to the original position without impairing the electrostatic force due to the fourth electrode 404s arranged along with the periphery of the second substrate 403.

Even when the first substrate 402 is displaced in an oblique direction (for example, direction of 45° from the x-axis and the y-axis), it becomes possible to return the first substrate to a desired position by the fourth electrodes 404 arranged at four sides of the second substrate 403. By taking out electrodes at a region at which the smallest effect of the electrostatic force is exerted, it becomes possible to take out electrodes without decreasing a spring force (restoring force).

Also in FIG. 7 according to the present embodiment, three electrodes (406a, 406b, 406c) are described as second electrodes 406 (and first electrodes). The same effects can be obtained even when the second electrodes 406 (and the first electrodes) are composed of more strip-shaped electrodes. Furthermore, when more first electrodes and/or second electrodes are used to constitute the vibration power generator, it is possible to obtain the effect capable of outputting a larger electric power with the displacement of the first substrate.

5. Fifth Embodiment

Figure 8:
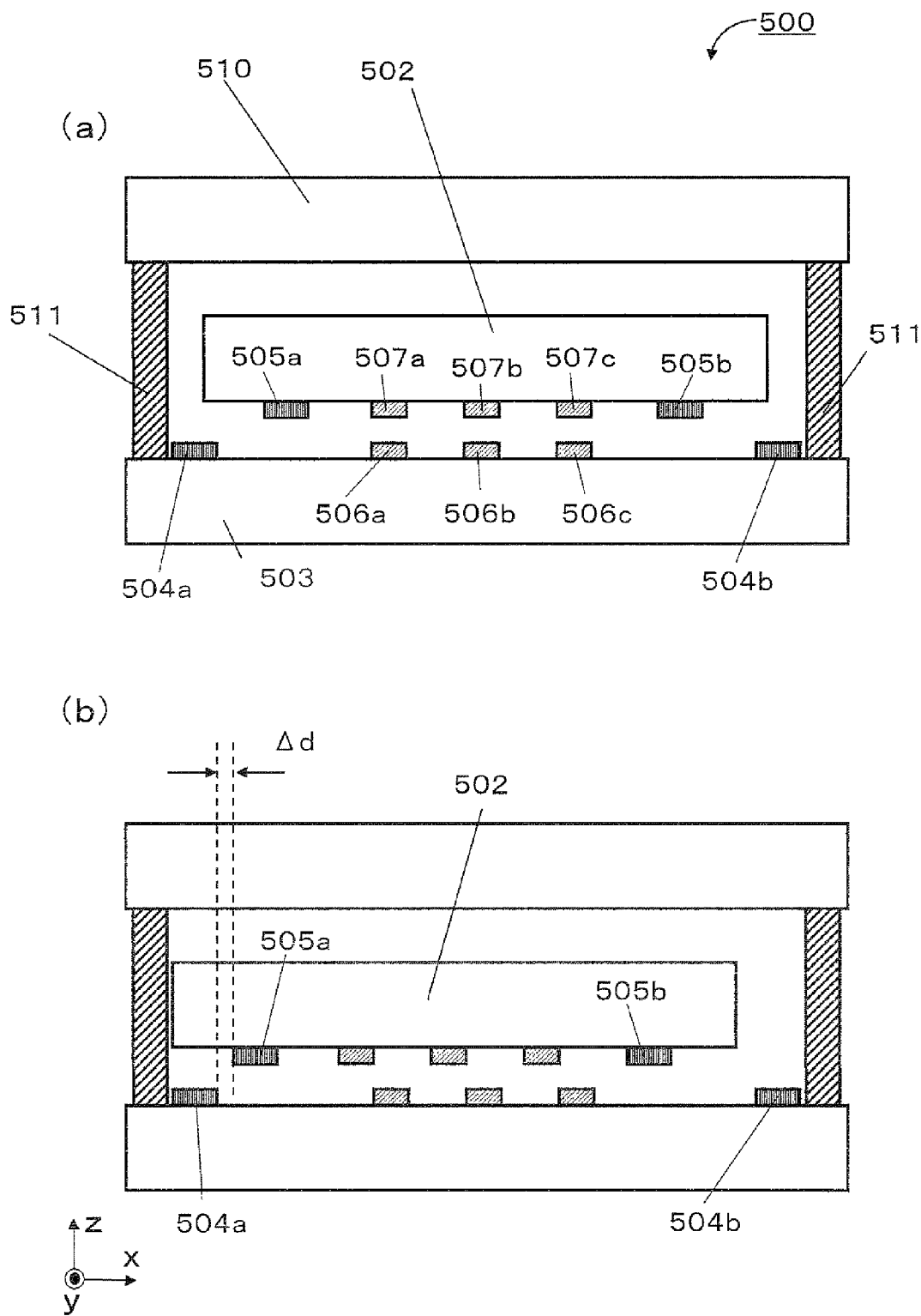
FIG. 8 is a cross-sectional view showing a vibration power generator according to a fifth embodiment of the present invention.

FIG. 8 includes a cross-sectional view (FIG. 8(a)) showing a vibration power generator 500 according to a fifth embodiment of the present invention and cross-sectional view (FIG. 8(b)) showing the vibration power generator 500 in a state where a first substrate 502 is displaced.

The reference symbols with numerals of the 500 mark are used for the respective components shown in FIG. 8 so as to clarify that they are components according to the present embodiment. Unless otherwise specified, the respective components may be identical to the corresponding components of the first to fourth embodiments denoted by the same reference symbols except for numerals of the hundred's digit.

In FIG. 8(a), a third substrate 510 is fixed above a second substrate 503 by a support 511. The first substrate 502 is arranged between the second substrate 503 and the third substrate 510 and between two supports 511 in a state where a space exists above and below thereof. That is, the first substrate 502 is arranged so as to float between the second substrate 503 and the third substrate 510 (spaced from the second substrate 503 and the third substrate 510).

The first substrate 502 is retained by an electrostatic force due to the third electrodes 505a, 505b formed on the first substrate 502 and the fourth electrode 504a, 504b formed on the second substrate.

The first substance 502 may also be retained using first projections and/or second projections, similarly to the embodiment shown in FIG. 6.

Herein, the descriptions of wirings and projections are omitted for simplification.

The first substrate 502 can be displaced in the x-axis direction, and the displacement (vibration) range can be controlled by two supports 511. That is, the first substrate 502 can be displaced up to the position where one end portion of the first substrate 502 is contacted with the support 511.

The fourth electrodes 504a, 504b are formed in the vicinity of the support 511 (also in the vicinity of an end face of the second substrate 503). The third electrodes 505a, 505b are formed in the vicinity of an end face of the first substrate 502 through a predetermined region from the end face.

When the first substrate 502 vibrates and displaces between two supports 511, the third electrodes 505a, 505b are formed so as not to overlap with the fourth electrodes 504a, 504b (the third electrodes 505a, 505b are always located inside the fourth electrodes 504a, 504b in the x-axis direction). That is to say, the region provided at the end face of the first substrate 503 (length in an x-axis direction) is formed in the size larger than the size (length in an x-axis direction) of the fourth electrodes 504a, 504b.

The operation of the vibration power generator 500 thus formed will be described.

The vibration power generator 500 performs electrical generation by displacing the first substrate 502 with respect to the second substrate 503 by vibration from the outside. In that case, the first substrate 502 is displaced by vibration from the outside. However, even when displaced to a maximum degree between two supports 511, the third electrodes 505a, 505b including a film retaining electric charges and the fourth electrodes 504a, 504b do not overlap. Therefore, the first substrate 502 is subjected to a force in the direction opposite to the displacement by an electrostatic force.

As used herein, third electrodes 505a, 505b and fourth electrodes 504a, 504b do not overlap means that third electrodes 505a, 505b and fourth electrodes 504a, 504b do not completely overlap.

That is, as shown in FIG. 8(b), even when the displacement of the first substrate 502 becomes maximum, a distance Δd between an end portion of the third electrodes and an end portion of the fourth electrodes (end portion of a third electrode 505a and end of a fourth electrode 504a in FIG. 8(b)) in the x direction satisfies the inequality expression: Δd>0.

By constituting the vibration power generator 500 in this way, the following effects can be obtained.

(7) It is possible to perform large amplitude operation in a low frequency region.

The item (7) will be described.

The third electrodes 505a, 505b are formed from the end face of the first substrate 502 through a given region, and the electrode arrangement is different from those of the first to fourth embodiments. In those embodiments, it is necessary to prevent the first substrate from displacing up to the end face of the space by setting a spring force (electrostatic force) at a larger value so as to ensure an electrostatic force. As a result, it is necessary to increase the spring force to some extent.

By constituting like the present embodiment, the third electrodes 505 and the fourth electrodes 504 do not overlap even when the first substrate 502 performs a large amplitude operation by decreasing an electrostatic force. Therefore, an electrostatic force is generated in a direction opposite to the displacement (accurately, direction of vector sum of a third substrate direction (x-axis direction) and a direction perpendicular thereto (z-axis direction)). Therefore, a decrease in a spring force (electrostatic force) enables a large amplitude operation in a lower frequency region, thus enabling electrical generation.

Figure 9:
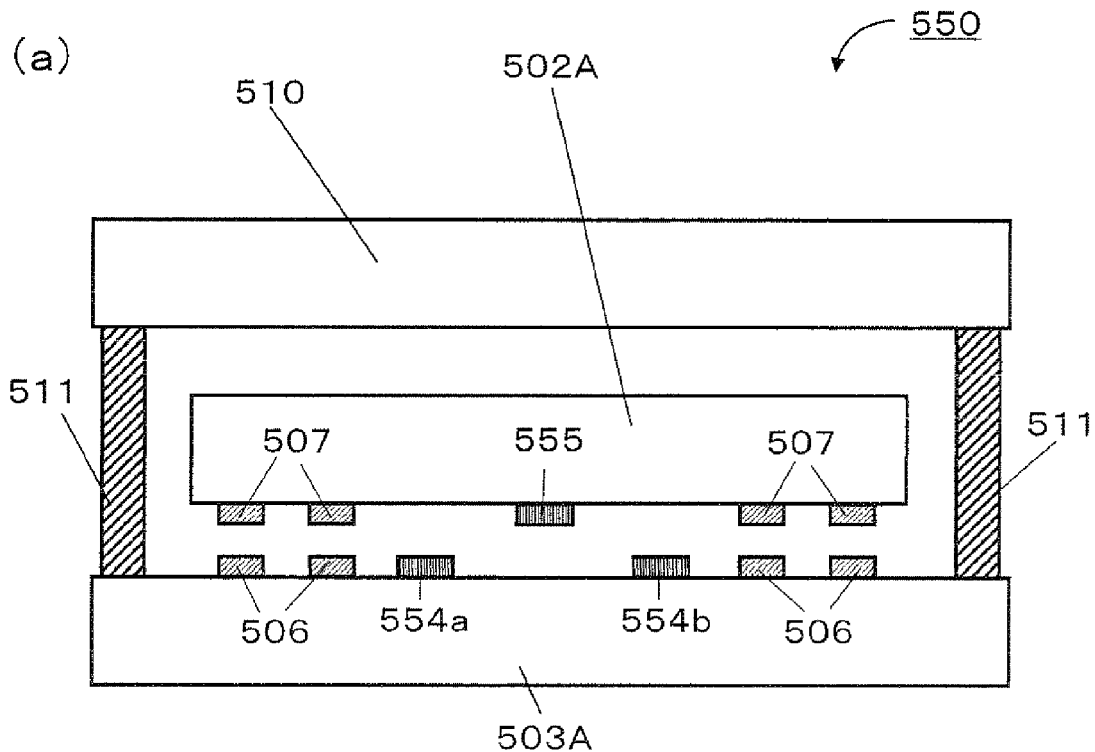
FIG. 9 is a cross-sectional view showing another constitution of a vibration power generator according to a fifth embodiment of the present invention.

FIG. 9 includes a cross-sectional view (FIG. 9(a)) showing another vibration power generator 550 according to the fifth embodiment of the present invention and a cross-sectional view (FIG. 9(b)) showing the vibration power generator 550 in a state where a first substrate 502A is displaced.

In the embodiment shown in FIG. 8, a region where an electrostatic force is generated is provided on the periphery of the first substrate 502. As shown in FIG. 9, the embodiment in which the third electrode 555 and fourth electrodes 554a, 554b are respectively provided at the center (center in the x-axis direction) of the first substrate 502A and the second substrate 503A is also included in the present embodiment.

Also in this case, even when the first substrate 502A performs maximum displacement between two supports 511, the same effects can be obtained by designing so that the third electrode 555 and the fourth electrodes 554a, 554b do not overlap.

Furthermore, the embodiment shown in FIG. 9 has an advantage that the number of the third electrode 555 can be set at one.

In the embodiments shown in FIG. 8 and FIG. 9, the third substrate 510 is arranged so as to limit the displacement of the first substrate 502 upward in the z-axis direction as an object, and the embodiments are included in the fifth embodiment including no third substrate 510.

6. Sixth Embodiment

Figure 10:
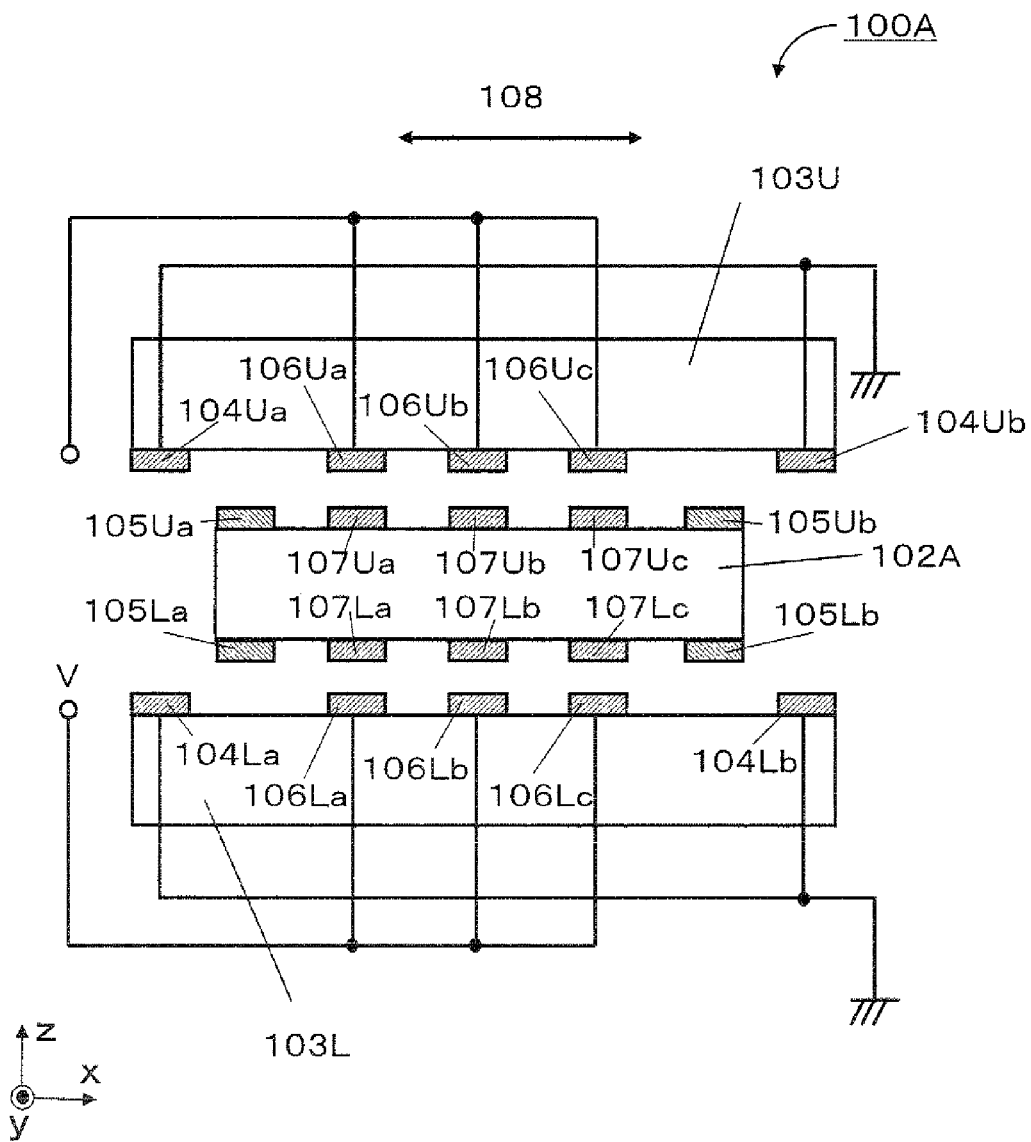
FIG. 10 is a cross-sectional view showing a vibration power generator according to a sixth embodiment of the present invention.
Figure 11:
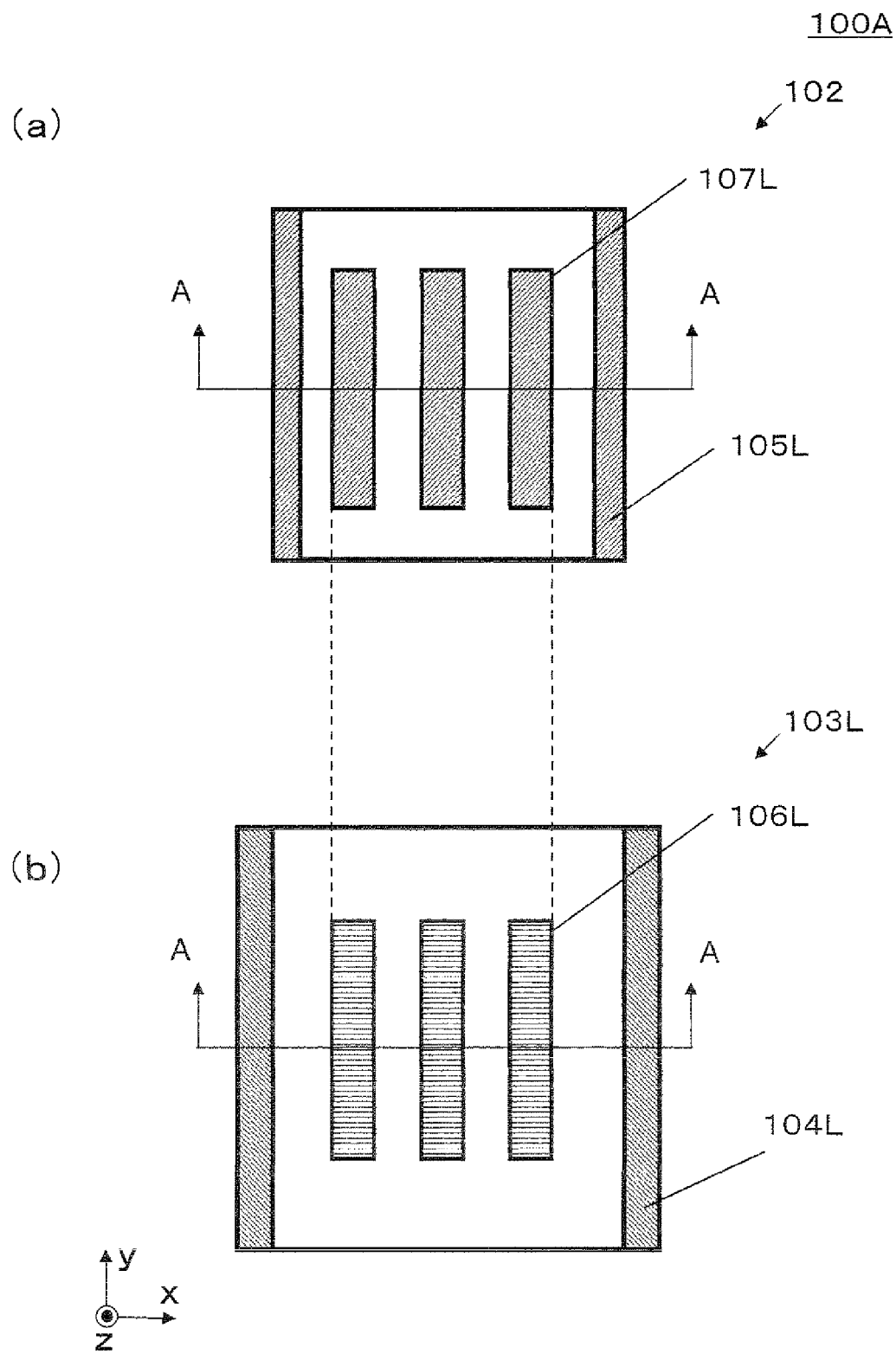
FIG. 11 includes FIG. 11(a) that is a top view showing a first substrate and FIG. 11(b) that is a top view showing a second substrate, according to the sixth embodiment of the present invention.

FIG. 10 is a cross-sectional view showing a vibration power generator 100A according to a sixth embodiment of the present invention, and FIG. 11 includes a top view (FIG. 11(a)) showing a first substrate 102A of the vibration power generator 100A shown in FIG. 10 and a top view (FIG. 11(b)) showing a second substrate 103L. The cross section shown in FIG. 10 corresponds to a cross section taken along lines A-A of FIG. 11.

The vibration power generator according to the sixth embodiment is different from the vibration power generators described in the first to fifth embodiments in that it includes an electrode for electrical generation and an electrode for forming an electrostatic force between the opposed substrates on both surfaces (on both two main surfaces) of the first substrate. Also, the vibration power generator according to the sixth embodiment is different from the vibration power generators described in the first to fifth embodiments in that a third substrate facing the other surface of the first substrate is used, in addition to a second substrate arranged opposite to one surface of the first substrate since electrodes are arranged on both surfaces of the first substrate in this way, and that an electrode for electrical generation is also arranged on this third substrate and an electrode for forming an electrostatic force is arranged between the third substrate and the first substrate.

The vibration power generator 100A will be described in detail below.

The vibration power generator 100A is composed of a first substrate 102A, a second substrate 103L opposite to one surface (a lower surface of a first substrate 102A in FIG. 10) of the first substrate 102A, and a third substrate 103U opposite to the other surface (upper surface of a first substrate 102A in FIG. 10) of the first substrate 102A.

First electrodes 107La, 107Lb, 107Lc are formed on one surface (lower surface in FIG. 10) of the first substrate 102A, and fifth electrodes 107Ua, 107Ub, 107Uc are formed on the other surface (upper surface in FIG. 10).

On a main surface (upper surface in FIG. 10) of the second substrate 103L opposite to one surface of the first substrate 102A, second electrodes 106La, 106Lb, 106Lc are respectively formed at the positions opposed to the first electrodes 107La, 107Lb, 107Lc.

On a main surface (lower surface in FIG. 10) of the third substrate 103U opposite to the other surface of the first substrate 102A, sixth electrodes 106Ua, 106Ub, 106Uc are respectively formed at the positions opposed to the fifth electrodes 107Ua, 107Ub, 107Uc.

Third electrodes 105La, 105Lb are formed on one surface of the first substrate 102A, and seventh electrodes 105Ua, 105Ub are formed on the other surface of the first substrate 102.

On a main surface of second substrate 103L opposite to one surface of the first substrate 102A, fourth electrodes 104La, 104Lb are respectively formed. On a main surface of the third substrate 103U opposite to the other surface of the first substrate 102A, eighth electrodes 104Ua, 104Ub are formed.

The first electrodes 107La, 107Lb, 107Lc, third electrodes 105La, 105Lb, fourth electrode 104La, 104Lb, fifth electrodes 107Ua, 107Ub, 107Uc, seventh electrodes 105Ua, 105Ub and eighth electrodes 104Ua, 104Ub are electret electrodes including a film retaining electric charges.

It is preferred that polarity of electric charges retained by the film of the third electrode 105L (that is, polarity of electric charges retained by the electret electrode 105L) and polarity of electric charges retained by the film of the fourth electrode 104L are the same (that is, when one is positive, the other one is also positive, whereas, when one is negative, the other one is negative) so that an electrostatic repulsive force (repulsive force) acts between the third electrodes 105L (105La, 105Lb) and the fourth electrodes 104L (104La, 104Lb).

It is also preferred that polarity of electric charges retained by the film of the first electrodes 107L (107La, 107Lb, 107Lc) and polarity of electric charges retained by the film of the third electrode 105L are the same. This is because the first electrodes 107L and third electrode 105 can be electrically charged at the same time, and thus the process becomes simple.

Similarly, it is preferred that polarity of electric charges retained by the film of the seventh electrode 105U and polarity of electric charges retained by the film of the eighth electrode 104U are the same (that is, when one is positive, the other one is also positive, whereas, when one is negative, the other one is negative) so that an electrostatic repulsive force (repulsive force) acts between the seventh electrodes 105U (105Ua, 105Ub) and the eighth electrodes 104U (104Ua, 104Ub).

Similarly, it is preferred that polarity of electric charges retained by the film of fifth electrodes 107U (107Ua, 107Ub, 107Uc) and polarity of electric charges retained by the film of the seventh electrode 105U and the eighth electrode 104U are the same. This is because the fifth electrode 107U, seventh electrode 105U and eighth electrode 104U can be electrically charged at the same time, and thus the process becomes simple.

In contrast, it is preferred that polarity of the film of the first electrode 107L and fifth electrode 107U (polarity of electric charges retained by electret electrode) is different. This is because the first substrate 102 can be substantially treated as pseudo-GND by forming electrodes charged with positive electric charges and negative electric charges on upper and lower surfaces of the first substrate 102.

Therefore, preferably, it is constituted so that polarity of electric charges retained by the fifth electrode 107U, seventh electrode 105U and eighth electrode 104U is different from polarity of electric charges retained by the first electrode 107L, third electrode 105L and fourth electrode 104L.

Not shown in FIG. 10, the second substrate 103L and the third substrate 103U are fixed, while the first substrate 102 is not fixed. Therefore, the first substrate 102 can move in a z-axis direction, and in at least one direction of an x-axis direction and a y-axis direction.

Since the third electrodes 105La, 105Lb and fourth electrodes 104La, 104Lb retain electric charges with the same polarity, an electrostatic repulsive force acts between the third electrodes 105La, 105Lb and fourth electrodes 104La, 104Lb. At this time, the strength of the electrostatic repulsive force varies depending on a relative position of the first substrate 102 and second substrate 103L, and the electrostatic repulsive force can be decomposed into a component of a crosswise direction in FIG. 10 (x direction in FIG. 10) among directions parallel to a main surface of the second substrate 103L, a component of a direction perpendicular to a main surface of the second substrate 103L (z-axis direction in FIG. 10), and a component of a direction perpendicular to a paper surface in FIG. 10 (y-axis direction in FIG. 10) among directions parallel to a main surface of the second substrate 103.

Similarly, since the seventh electrodes 105Ua, 105Ub and eighth electrodes 104Ua, 104Ub retain electric charges with the same polarity, an electrostatic repulsive force acts between the seventh electrodes 105Ua, 105Ub and eighth electrodes 104Ua, 104Ub. At this time, the strength of the electrostatic repulsive force varies depending on a relative position of the first substrate 102 and third substrate 103U, and the electrostatic repulsive force can be decomposed into a component of a crosswise direction in FIG. 10 (x direction in FIG. 10) among directions parallel to a main surface of the third substrate 103U, a component of a direction perpendicular to a main surface of the third substrate 103U (z-axis direction in FIG. 10), and a component of a direction perpendicular to a paper surface in FIG. 10 (y-axis direction in FIG. 10) among directions parallel to a main surface of the third substrate 103U.

The first substrate 102A is retained through a space (retained in a state of floating in air) at a position where a z-axis direction component of an electrostatic repulsive force between the third electrodes 105La, 105Lb and fourth electrodes 104La, 104Lb, a z-axis direction component of an electrostatic repulsive force between the seventh electrodes 105Ua, 105Ub and eighth electrodes 104Ua, 104Ub, and gravity acting on the first substrate 102A are balanced.

A feature of the present embodiment is that third electrodes 105La, 105Lb and fourth electrodes 104La, 104Lb, and seventh electrodes 105Ua, 105Ub and eighth electrodes 104Ua, 104Ub are arranged so that a force (restoring force) of returning to an original position is generated by at least one of an x-axis direction component or a z-axis direction component of an electrostatic force (electrostatic repulsive force) when the first substrate is moved in at least one of an x-axis direction or a y-axis direction (that is, a direction parallel to a main surface of the first substrate 102A)).

That is, the first substrate 102 is retained at a predetermined position of the z-axis direction by an electrostatic force acting between third electrodes 105La, 105Lb and fourth electrodes 104La, 104Lb and an electrostatic force acting between seventh electrodes 105Ua, 105Ub and eighth electrodes 104Ua, 104Ub, and also when the external force does not act, the first substrate is also retained at a predetermined position in an x-axis direction and/or a y-axis direction (direction parallel to a main surface of the first substrate 102A).

In this way, the arrangement of third electrodes 105La, 105Lb and fourth electrodes 104La, 104Lb, and seventh electrodes 105Ua, 105Ub and eighth electrodes 104Ua, 104Ub enables the first substrate 102 to vibrate in an x-axis direction and/or a y-axis direction without using mechanical springs.

As a result, the overlapping area between first electrodes 107L (107La, 107Lb, 107Lc) and second electrodes 106L (106La, 106Lb, 106Lc), and the overlapping area between fifth electrodes 107U (107Ua, 107Ub, 107Uc) and sixth electrodes 106U (106Ua, 106Ub, 106Uc) vary and thus the vibration power generator 100A performs electrical generation.

Next, the electrode arrangement will be described.

FIG. 11(*a*) shows lower surface of a first substrate 102A, and FIG. 11(*b*) shows an upper surface of a second substrate 103L.

As shown in FIG. 11(*a*), the first electrodes 107L (corresponding to 107La, 107Lb and 107Lc of FIG. 10) are composed of a plurality of strip-shaped electrodes in which a longitudinal direction is arranged parallel to the y-axis, and the plurality of electrode are constituted by electrically connecting to each constitution. As shown in FIG. 11(*b*), similarly, the second electrodes 106L (corresponding to 106La, 106Lb, 106Lc in FIG. 10) are also composed of a plurality of strip-shaped electrodes arranged parallel to the y-axis and the plurality of electrode are also constituted by electrically connecting to each constitution. That is, electrodes have the same arrangement as that in FIG. 3. In FIGS. 11(a) and 11(b), a wiring structure is not shown for simplification.

Along the periphery (end portion) extending in the y-axis direction of the first substrate 102A, two third electrodes 105L (corresponding to 105La, 105Lb in FIG. 10) are arranged.

Similarly, two fourth electrodes 104L (corresponding to 104La, 104Lb in FIG. 10) are arranged along the periphery (end portion) extending in the y-axis direction of the second substrate 103L.

In the x-axis direction, the fourth electrodes 104L are arranged outside the third electrode 105L.

Two third electrodes 105L are electrically connected to each other. Two fourth electrodes 106L are electrically connected to each other and ground-contacted.

The embodiment shown in FIG. 11(a) has an advantage that the structure becomes simple since the third electrodes 105La may be arranged at a part of the periphery, not the entire periphery of the first substrate 102. Similarly, the embodiment shown in FIG. 11(b) has an advantage that the structure becomes simple since the fourth electrodes 104L may be arranged at a part of the periphery, not the entire periphery of the second substrate 103L.

In the embodiment shown in FIGS. 11(a) and 11(b), the third electrodes 105L and the fourth electrodes 104L are respectively arranged over the entire periphery (end portion) extending in the y-axis direction of the substrate on which they have been arranged. For example, they may be arranged only at corner portions (four corners) of the substrate, or may be arranged only at a position apart from the corner portions.

In the embodiment shown in FIG. 11, fourth electrodes 104L are arranged outside the third electrodes 105L in the x direction. Alternatively, the third electrode 105L may be arranged outside the fourth electrodes 104L instead.

The arrangement of the first electrodes 107L and the arrangement of the third electrodes 105L, described hereinabove, may be respectively applied to the arrangement of fifth electrodes 107U and the arrangement of seventh electrodes 105U on the upper surface of the first substrate 102A.

Similarly, the arrangement of the second electrodes 106L and the arrangement of the fourth electrodes 104L, described hereinabove, may be respectively applied to the arrangement of sixth electrodes 106U and the arrangement of eighth electrodes 104U on the lower surface of the third substrate 103U.

When the arrangement of the fifth electrodes 107U and the arrangement of the seventh electrode 105U are respectively made identical to the arrangement of the first electrodes 107L and the arrangement of the third electrodes 105L, and also the arrangement of the sixth electrodes 106U and the arrangement of the eighth electrodes 104U are respectively made identical to the arrangement of the second electrodes 106L and the arrangement of the fourth electrodes 104L, a restoring force in the y-axis direction does not act on the first substrate 102A.

Therefore, in order to limit the displacement of the first substrate 102A in the y-axis direction within a predetermined range, for example, it is preferred to provide restriction means such as projections at the end portion in the y-axis direction of the second substrate 103L.

The operation of the vibration power generator 100 will be described.

As described above, since the third electrodes 105L and the fourth electrodes 104L have electric charges with the same polarity, a repulsive force (electrostatic repulsive force) by an electrostatic force acts therebetween. Similarly, since the seventh electrodes 105U and the eighth electrodes 104U have electric charges with the same polarity, a repulsive force by an electrostatic force acts therebetween.

Therefore, unless the external force acts on the first substrate 102, the first substrate 102 is retained at a predetermined position. That is, with respect to the z-axis direction, the substrate 102A floats and stays at the position where these repulsive forces and gravity acting on the first substrate 102A are balanced.

With respect to the x-axis direction, the first substrate 102A stays at the position where a repulsive force acting (force of moving the first substrate 102A to the right direction of FIG. 10) between the third electrodes 105La and the fourth electrodes 104La, and the seventh electrodes 105Ua and the eighth electrodes 104Ua, and a repulsive force acting (force of moving the first substrate 102A to the left direction of FIG. 10) between the third electrodes 105Lb and the fourth electrodes 104Lb, and the seventh electrodes 105Ub and the eighth electrodes 104Ub are balanced.

When vibration (external force) is applied from the outside, the first substrate 102A relatively displaces (moves) with respect to the second substrate 103L and the third substrate 103U. The case where vibration in the x-axis direction is imparted will be descried. When the first substrate 102A displaces to the right side from the position where the above repulsive force is balanced by vibration, a repulsive force acting between the third electrodes 105Lb and the fourth electrodes 104Lb, and repulsive force acting between the seventh electrodes 105Ub and the eighth electrodes 104Ub becomes more than a repulsive force acting between the third electrodes 105La and the fourth electrodes 104La, and the seventh electrodes 105Ua and the eighth electrodes 104Ua, and thus a force of returning in the left direction acts on the first substrate 102A.

In contract, when the first substrate 102A displaces to the left side from the position where the repulsive force is balanced by vibration, a force of returning in the right direction acts on the first substrate 102A. In this way, a force of pushing back in a direction opposite to the displaced direction (restoring force) is generated in the first substrate 102A, and thus the first substrate 102A can be returned to the original position.

The relative displacement of the first substrate 102A with respect to the second substrate 103L and the third substrate 103U utilizing this restoring force brings about increase and decrease of the overlapping area between the first electrodes 107La, 107Lb, 107Lc and second electrodes 106La, 106Lb, 106Lc, and the overlapping area between the fifth electrodes 107Ua, 107Ub, 107Uc and the sixth electrodes 106Ua, 106Ub, 106Uc.

The increase and decrease of the overlapping area brings about increase and decrease of the amount of electric charges to be induced to the second electrodes 106L (106La, 106Lb, 106Lc) and the sixth electrodes 106U (106Ua, 106Ub, 106Uc) containing no electret. The electrical generation is performed by extracting the electric charges as electrical energy. As long as the first substrate 102A continues vibrating in which it is relatively displaced by receiving vibration from the outside and returns to the original position by an electrostatic force, the increase and decrease of the overlapping area is continued.

According to the vibration power generator 100 according to the embodiment of the present invention, the following effects can be obtained.

(8) It is possible to perform electrical generation even by low frequency vibration.
(9) Improvement in mechanical reliability, and small mechanical loss
(10) Large output electric power The item (8) will be described in detail. The first substrate 102A, the second substrate 103L and the third substrate 103U do not include a mechanical elastic structural body existing in a conventional structure and utilizes a spring force by an electrostatic force and is not limited by a resonance frequency determined by size, material property and the like of the elastic structural body, and thus enabling electrical generation even by vibration in a low frequency region.

When the mass of the first substrate 102A is regarded as m for simplification, assuming that a force F=ma is applied by acceleration a of external vibration, the first substrate 102A performs displacement by a force F. Also, lateral unbalance is generated by the amount of displacement, whereby, a force is applied so as to return to the original position. In this way, the amount of displacement of the first substrate 102A of the vibration power generator 100A shown in the present embodiment depends on acceleration, and thus enabling electrical generation even by vibration in a low frequency region.

The item (9) will be described in detail.

The vibration power generator 100A shown in the present embodiment does not include a mechanical elastic structural body existing in a conventional structure. Therefore, there is no position where elastic fatigue arises, which is caused by a problem such as difficulty of miniaturization by performing designing with sufficient allowance to ensure reliability against an elastic strain of the elastic structural body in the structure. As a result, it is easy to endure mechanical reliability in the spring portion and to ensure reliability when miniaturization and operation at a large amplitude are performed.

It is not necessary to form a member made of a quite different material, like a substrate made of silicon, glass and the like, and resin springs. Therefore there is an advantage that the structure and process are not complicated.

Furthermore, first electrodes 107L (107La, 107Lb, 107Lc) formed on a lower surface of the first substrate 102A, and fifth electrodes 107U (107Ua, 107Ub, 107Uc) formed on an upper surface retain electric charges with different polarity.

Therefore, among the fifth electrodes 107U and the first electrodes 107L, the other electrode has an opposite potential relative to a potential of one electrode. Therefore, a pseudo-GND surface exists in the first substrate 102A.

As a result, when the arrangement of the first electrodes 107L and the second electrodes 106L, is identical to the arrangement of the fifth electrodes 107U and the sixth electrodes 106U, the potential of electric power extracted from the second electrodes 106L is opposite to the potential of electric power extracted from the sixth electrode 106U in the case of extracting electrical energy from the opposed electrodes (second electrodes 106L (106La, 106Lb, 106Lc), sixth electrodes 106U (106Ua, 106Ub, 106Uc)).

Preferably, it is constituted that GND is extracted from the first substrate using a soft wiring such as a lead wire and ground-contacted. This is because a potential to be extracted is stabilized not only by forming a pseudo-GND surface, but also by ground-contacting a first substrate 102 to a standard potential L (GND).

The item (10) will be described in detail.

In the vibration power generator shown in the present embodiment, electrical energy can be extracted as an opposite voltage using two pairs of the opposed electrodes (first electrodes 107L and second electrodes 106L, and fifth electrodes 107U and sixth electrode 106U) as described above. That is, it is possible to obtain electric power, which is two times larger than that in case of using the vibration power generators in which electrodes are formed only at one side of the first substrate shown in the first to fifth embodiments, when the first substrate once vibrates.

(Electret Electrodes)

Electrodes including a film retaining electric charges (electret electrodes) used in the present embodiment will be described in detail below.

Figure 12:
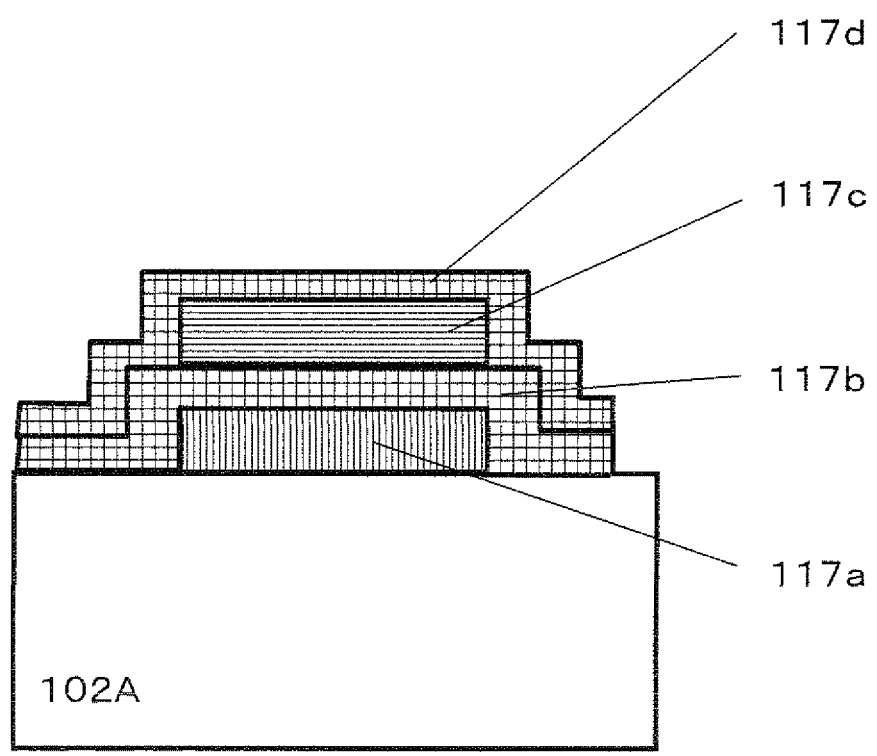
FIG. 12 is a cross-sectional view showing an elecret electrode according to the sixth embodiment of the present invention.

FIG. 12 is a cross-sectional view showing electret electrode that can be used as any of first electrodes 107La, 107Lb, 107Lc, third electrodes 105La, 105Lb, fourth electrode 104La, 104Lb, fifth electrodes 107Ua, 107Ub, 107Uc, seventh electrodes 105Ua, 105Ub and eighth electrodes 104Ua, 104Ub. The electret electrodes shown in FIG. 12 have the same structure as that of electret electrodes shown in FIG. 4.

Description will be made by way of fifth electrodes 107U (107Ua, 107Ub, 107Uc) as an example. As a matter of course, other electrodes respectively have the same constitution on the corresponding substrate.

On a first substrate 102A, a conductor 117a is formed. A first insulating material 117b, an electret 117c as a film retaining electric charges, and a second insulating material 117d are formed on the conductor 117a.

Each conductor 117 of fifth electrodes 107Ua, 107Ub, 107Uc is electrically connected.

The electret 117c may be formed on the entire conductor 117a and may be arranged only at a part on a strip-shaped conductor 117a. It is preferred to form at a part of the strip-shaped conductor 117a from the viewpoint of stability of the process and device characteristics.

It is particularly preferred to use a high-resistance substrate as the first substrate 102. In this case, it is desired to form the electret 117c only on the conductor 117a. By forming in this way, it becomes possible to forcibly inject electric charges into the electret 117c in the case of injecting electric charges, and thus it becomes possible to produce an electret with stable electric charges.

As used herein, the high-resistance substrate includes not only a substrate in which the entire substrate has high resistivity, but also a substrate in which an insulation film such as film oxide is formed on a surface of a low-resistance substrate (for example, a low-resistance silicon substrate). As a matter of course, the same effect as that of the former can be obtained when the latter is used.

An electret material used in an electret 117c will be described below.

As described above, first electrodes 107L, third electrodes 105L, fourth electrodes 104L, fifth electrodes 107U, seventh electrodes 105U and eighth electrodes 104U are constituted as an electret electrode including an electret film retaining electric charges.

It is possible to use, as the electret material constituting the electret film 117c, include polymeric materials such as polypropylene, polyester terephthalate and polyvinyl chloride, or inorganic materials such as silicon oxide. It is preferred to use silicon oxide having excellent dielectric voltage and heat resistance among these materials.

In order to improve moisture resistance, it is preferred to have a structure in which the periphery of silicon oxide as an electric charge-retaining film is completely coated with an insulation film such as a silicon nitride film. For example, when silicon oxide is used, it becomes possible to obtain an electret 117c, that is excellent in dielectric voltage and heat resistance, and is also excellent in moisture resistance, by having a structure in which the periphery of silicon oxide as an electric charge-retaining film is completely coated with an insulation film such as a silicon nitride film.

In the present embodiment, the example in which first electrodes 107L and fifth electrode 107U retain electric charges with different polarity is shown. However, by providing electric extraction means such as a lead wire from a first substrate 102A and ground-contacting fifth electrodes 107U and first electrodes 107L, a vibration power generator 100A can perform electrical generation in case the fifth electrodes 107U and the first electrodes 107L retain electric charges with the same polarity. In this case, since electric charges are output as a potential of the same phase (electric charges with the same polarity) from the second electrodes 106L and sixth electrodes 106U, electrically generated electric power can be extracted by wiring using an output terminal in common.

In this way, by making polarity of the first electrodes 107L identical to polarity of the fifth electrode 107U, it is possible for electric charges retained by all of first electrodes 107L, third electrode 105L, fourth electrode 104L, fifth electrode 107U, seventh electrode 105U and eighth electrode 104U as electret electrodes to have the same polarity. There is an advantage that electrodes can be charged at the same time upon production and the process can be simplified.

In the present embodiment, with respect to electrodes that are oppositely arranged and contribute to electrical generation, the example in which first electrodes 107La, 107Lb, 107Lc and fifth electrodes 107Ua, 107Ub, 107Uc are electret electrodes retaining electric charges, and second electrodes 106La, 106Lb, 106Lc and sixth electrode 106Ua, 106Ub, 106Uc are conventional electrodes containing no electret is shown.

However, electret electrodes may be second electrodes 106La, 106Lb, 106Lc and sixth electrodes 106Ua, 106Ub, 106Uc, and first electrodes 107La, 107Lb, 107Lc and fifth electrodes 107Ua, 107Ub, 107Uc may be conventional electrodes and, as a matter of course, the same effects can also be obtained in this case.

Not shown in FIG. 10, FIG. 11 and FIG. 12, a first insulating material 117b and a second insulating material 117d are formed so that a conductor 117a can be electrically connected to an external terminal. The first insulating material 117b and the second insulating material 117d may be formed so as to cover at least an electret 117c, and it is not necessary that the first insulating material 117b and the second insulating material 117d are formed on the entire surface of the substrate.

In the embodiment shown in FIG. 11, the second electrodes 106La, 106Lb, 106Lc are formed only on the portion opposite to the first electrodes 107La, 107Lb, 107Lc. It is preferred to form the second electrodes 106L up to the region that extends over the first electrodes 107L (formed outside the first electrodes 107L (first electrodes 107La and 107Lc)). More preferably, the second electrodes 106L are formed up to the vibration limit (range where the displacement can be performed by vibration) of the first substrate 102A (particularly, first electrodes 107L).

Similarly, it is preferred to form the sixth electrode 106U up to the region that extends over the fifth electrodes 107U (formed outside fifth electrodes 107U (fifth electrode 107Ua and 107Uc)). More preferably, the sixth electrodes 106U are formed up to the vibration limit (range where the displacement can be performed by vibration) of the first substrate 102A (particularly, fifth electrode 107U).

With such constitution, the following effects can be obtained.

(11) It is possible to make increase and decrease of the overlapping area constant.

When second electrodes 106L are formed only at the position opposite generally to first electrodes 107L in a resting state, in case the first substrate 102 vibrates at a large amplitude (large displacement), there arises a problem that the time during which the first electrodes 107L (particularly, first electrodes 107La, 107Lc located at the end) and the second electrodes 106L do not overlap increases, thus lowering the increase and decrease of the overlapping area.

The same shall apply to the case where sixth electrodes 106U are formed only at the position opposite generally to fifth electrode 107U in a resting state and the first substrate 102 vibrates at a large amplitude (large displacement).

However, by forming the second electrodes 106L in the region larger than that of the first electrode 107 (forming outside the first electrodes 107L), and thus it is possible to prevent the increase and decrease of the overlapping area from lowering and to always maintain the increase and decrease of the overlapping area constant. That is, it is possible to stabilize the amount of electrical generation of the vibration power generator 100A.

Also, when the sixth electrodes 106U are formed in the region larger than that of the first electrode 107U (formed outside the fifth electrodes 107U), the same effects can be obtained.

The constitution of the second electrodes 106L and the sixth electrode 106U can increase an amplitude of the first substrate 102A, like the structure using an electrostatic force shown in the present embodiment, high effects are exerted in the vibration power generator in which vibration is performed over a width (for example, width of individual electrode such as second electrode 102La) of the second electrodes 106L or sixth electrodes 106U.

Furthermore, even when a shape of a surface (main surface) of the first substrate 102 may be, in addition to a square shown in FIG. 2, rectangle, or other shapes, the same effects can be obtained by adopting the arrangement of electrodes for electrical generation (first electrodes 107L, fifth electrode 107U) and electrodes for generation of an electrostatic force (third electrode 105L, seventh electrode 105U) shown in the present embodiment, as a matter of course.

In the embodiment shown in FIG. 10, the second substrate 103L and the third substrate 103U are fixed to form the non-vibrating constitution. Any one or both of the second substrate 103L and the third substrate 103L may have a vibratable (movable) structure without fixing, similar to the first substrate 102A.

In the embodiment shown in FIG. 10, the vibration power generator 100A imparts a restoring force to the first substrate 102A using an electrostatic force between third electrodes 105L (105La, 105Lb) and fourth electrodes 104L (104La, 104Lb) and an electrostatic force between seventh electrodes 105U (105Ua, 105Ub) and eighth electrodes 104U (104Ua, 104Ub) as described above. In this way, it is preferred to act a restoring force on both upper surface and lower surface sides of the first substrate 102A since it is possible to avoid a force applied only upward or downward to stably operate while a restoring force in a planar direction (direction parallel to a main surface of the first substrate 102A) is applied.

However, for example, the vibration power generator 100A can perform electrical generation by providing third electrodes 105L (105La, 105Lb) and fourth electrodes 104L (104La, 104Lb) without providing seventh electrodes 105U (105Ua, 105Ub) and eighth electrodes 104U (104Ua, 104Ub) and acting an electrostatic force only at the lower side of the first substrate 102A.

The embodiment in which electrodes capable of generating a restoring force are provided only on one side of the first substrate 102A is included in the present embodiment, as a matter of course.

Variation

Figure 13:
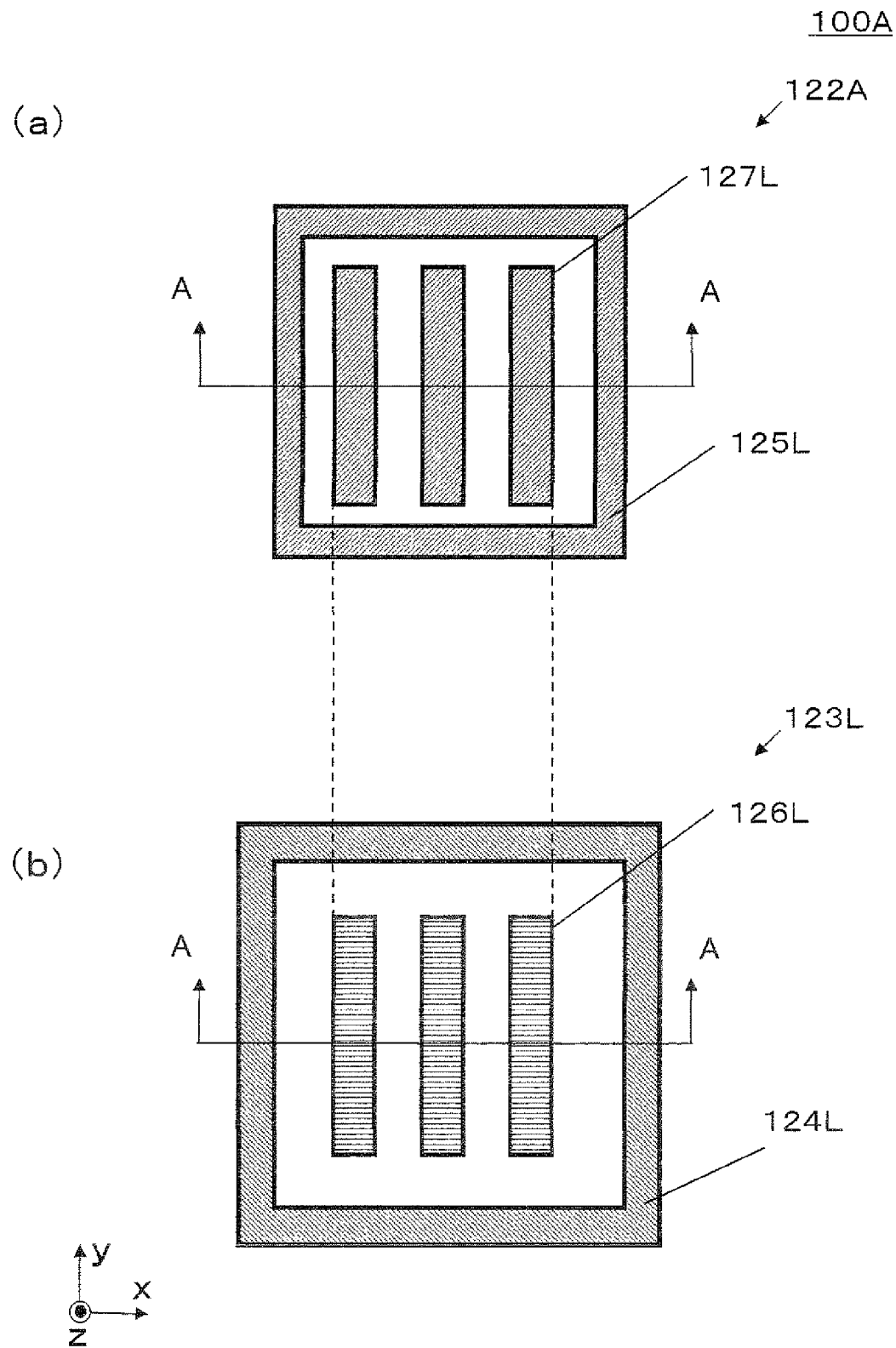
FIG. 13 is a top view showing a first substrate and a second substrate having another structure according to the sixth embodiment of the present invention.

FIG. 13 is top views showing a lower surface of a first substrate 122A (FIG. 13(a)) and a second substrate 123L (FIG. 13(b)) according to variation of the present embodiment.

In the first substrate 102A shown in FIG. 11, third electrodes 105L are arranged only at the portion extending in the y-axis direction on the periphery of the substrate, whereas, the first substrate 122A of variation is different in that third electrodes (electret electrodes) 125L are arranged along the end portion of the substrate (outer periphery) on the entire periphery.

Similarly, the second substrate 123L is also different from the second substrate 103L in that fourth electrodes (electret electrodes) 104L are arranged along the end portion of the substrate (outer periphery) on the entire periphery.

That is, this variation has the same electrode structure as that shown in FIG. 2 in variation shown in FIG. 13.

The portion other than the third electrodes 125L of the first substrate 122A may be the same as in the first substrate 102A and, for example, the first electrode 127L may be the same as those of the above first electrodes 107L. Similarly, the portion other than the fourth electrodes 124L of the second substrate 123L may be the same as in the second substrate 103L and, for example, the second electrodes 126L may be the same as those of the above second electrodes 106L.

The fourth electrodes 124L on the second substrate 123L are arranged outside the third electrodes 125L on the first substrate 122A. Since the fourth electrodes 124L and the third electrodes 125L are electret electrodes with the same polarity, an electrostatic repulsive force is generated between the fourth electrodes 124L and the third electrodes 125L. This electrostatic repulsive force is also generated in the y-axis direction, in addition to the x-axis direction and the z-axis direction.

That is, in the present variation, the restoring force acting on the first substrate 122A also acts in the y-axis direction, in addition to the same x-axis direction and z-axis direction as those of the embodiment shown in FIG. 10. As a result, even when the first substrate 122A is displaced in the direction other than the x-axis direction, for example, y-axis direction by an external force, a force of returning the first substrate 122A to a predetermined position is generated, and thus the effect of operating a vibration power generator more stably is exerted.

In order to surely obtain this effect, it is preferred that the form of seventh electrodes to be arranged on an upper surface of the first substrate 122A is made identical to that of the third electrodes 125L, and the form of eighth electrodes to be arranged on a lower surface of the third substrate 103U is made identical to that of the fourth electrode 124L.

In the embodiment shown in FIG. 13, the fourth electrodes 124L are arranged outside the third electrodes 125L. Alternatively, the third electrodes 125L may be arranged outside the fourth electrodes 124L.

7. Seventh Embodiment

Figure 14:
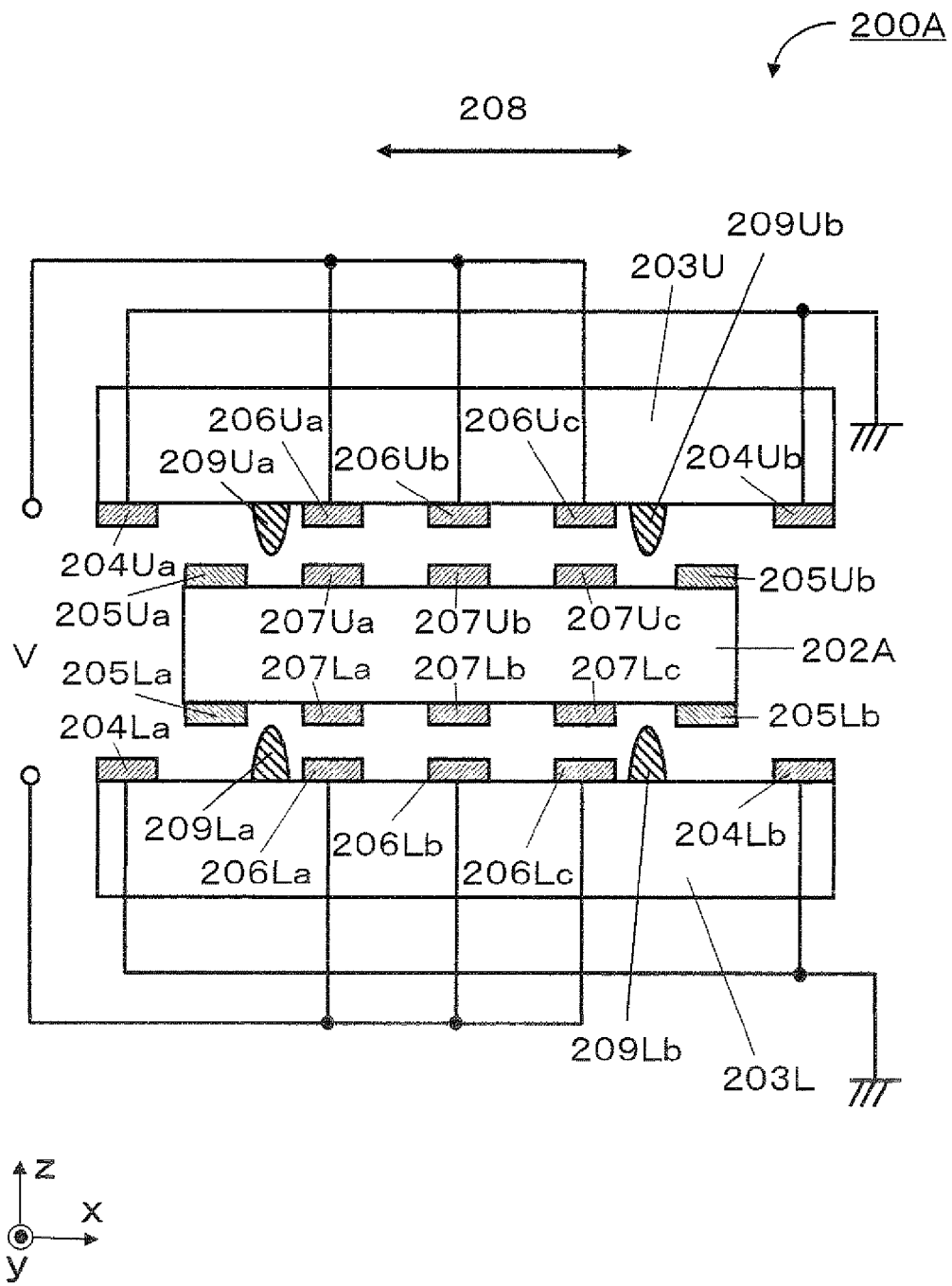
FIG. 14 is a cross-sectional view showing a vibration power generator according to the seventh embodiment of the present invention.

FIG. 14 is a cross-sectional view showing a vibration power generator 200A according to a seventh embodiment of the present invention. The vibration power generator according to a seventh embodiment is different from the sixth embodiment in that projections 209La, 209Lb, 209Ua, 209Ub are formed between the first substrate 202A and the second substrate 203L, and formed between the first substrate 202A and the third substrate 203U.

The reference symbols with numerals of the 200 mark are used for the respective components shown in FIG. 14 so as to clarify that they are components according to the present embodiment. Unless otherwise specified, the respective components may be identical to the corresponding components of the sixth embodiment denoted by the same reference symbols except for numerals of the hundred's digit.

The projections 209La, 209Lb, 209Ua, 209Ub have one end fixed to any one of the second substrate 203L and the third substrate 203U, and the other end that can be contacted with the first substrate 202A without being fixed. Alternatively, the projections 209La, 209L, b209Ua, 209Ub have one end fixed to the first substrate 202A, and the other end that can be contacted with any one of the second substrate 203L or the third substrate 203U without being fixed.

In the embodiment shown in FIG. 14, the projections 209La, 209Lb have one end (lower end) fixed to the second substrate 203L, and the other end (upper end) that can be contacted with a lower surface of the first substrate 202A without being fixed. The projections 209Ua, 2009Ub have one end (upper end) fixed to the third substrate 203U, and the other end (lower end) that can be contacted with an upper surface of the first substrate 202A without being fixed.

By the projections 209La, 209Lb, b209Ua, 209Ub, stiction (or sticking) can be avoided more surely.

The Operation of the Vibration Power Generator 200a Will be Described Below

The vibration power generator 200A performs electrical generation by displacing (direction of arrow 208 in FIG. 14) a first substrate 202A with respect to a second substrate 203L and a third substrate 203U by vibration from the outside. In that case, the first substrate 202A is displaced by vibration from the outside and then returned to a predetermined position by an electrostatic force.

When the first substrate 202A is displaced, an electrostatic force of opposite side of the direction to be displaced decreases.

When the first substrate 202A is displaced in the right direction of FIG. 14, an electrostatic repulsive force generated between third electrodes 205Lb and fourth electrodes 204Lb, and generated between seventh electrodes 205Ub and eighth electrodes 204Ub becomes stronger than an electrostatic repulsive force generated between third electrodes 205La and fourth electrodes 204La, and generated between seventh electrodes 205Ua and eighth electrodes 204Ua.

This means that a restoring force of returning a substrate 202A in a left direction, that is, to the original position acts, taking a component in an x-axis direction of an electrostatic repulsive force into consideration.

Taking a component in an z-axis direction of an electrostatic repulsive force into consideration, it means that an electrostatic repulsive force, that retains a substrate 202A in the z-axis direction, varies at a right side and a left side of the substrate 202A. That is, the displacement in the z-axis direction may sometimes become unstable.

In the present embodiment, it becomes possible to operate a first substrate 202A more stably by providing projections 209La, 209Lb, 209Ua, 209Ub, retaining the first substrate 202A using the projections, and controlling the displacement in the z-axis direction within a predetermined range.

With such constitution, the following effects can be obtained.

(12) It is possible to operate a first substrate more stably.

The item (12) will be further described.

As shown in the explanation of the operation of the present embodiment, by constituting projections 209La, 209Lb, 209Ua, 209Ub so as to retain a first substrate 202A, it becomes possible to operate the first substrate 202A more stably even when unbalance in an electrostatic force between a displacement direction and an the direction opposite to the displacement when the first substrate 202A is displaced.

Particularly in the vibration power generator capable of operating at a large amplitude according to the present invention, it is possible to largely displace a first substrate. As the displacement increases, unbalance in an electrostatic force between one end side and the other end side of the first substrate (for example, right side and left side of FIG. 14) is likely to occur.

When the unbalance in an electrostatic force causes inclination of the first substrate, an unbalance in applied forces between upward direction and downward direction arises. Therefore, correction of unbalance is sometimes required. However, when an electrostatic force is increased so as to correct unbalance, the restoring force in the x-axis direction excessively increases to cause a problem that the first substrate is not sufficiently displaced by external vibration.

However, in the present embodiment, it is possible to prevent inclination from occurring by providing projections 209La, 209Lb, 209Ua, 209Ub and regulating (controlling) the displacement in the z-axis direction of the first substrate 202A. As a result, it becomes possible to widen a usable range of a vibration power generator including a substrate accompanying with large displacement.

Also in the present embodiment, it is preferred to form second electrodes 206L up to the region that extends over first electrodes 207L (formed outside first electrodes 207L (first electrodes 207La and 207Lc)). More preferably, second electrodes 206L are formed up to the vibration limit (range where the displacement can be performed by vibration) of the first substrate 202A (particularly, first electrodes 207L).

Similarly, it is preferred to form sixth electrodes 206U up to the region that extends over fifth electrodes 207U (formed outside fifth electrodes 207U (fifth electrodes 207Ua and 207Uc)). More preferably, sixth electrodes 206U are formed up to the vibration limit (range where the displacement can be performed by vibration) of the first substrate 202A (particularly, fifth electrode 207U).

Projections 209La, 209Lb, 209Ua, 209Ub may be made of an insulating material and a semiconductor material.

The projections 209La, 209Lb, 209Ua, 209Ub may be formed, including a conductor and, in this case, the protrusions may be used to take out electrodes by electrically connecting to electrodes on the first substrate 202.

In the embodiment shown in FIG. 14, the projections 209La, 209Lb, 209Ua, 209Ub are provided between the first substrate 202A and the second substrate 203L (lower side of the first substrate 202A) and provided between the first substrate 202A and the third substrate 203U (upper side of the first substrate 202A). This is preferred embodiment to stably vibrate without causing inclination of the first substrate 202A even when the first substrate 202A is displaced more largely.

Preferably, projections 209La, 209Lb or projections 209Ua, 209Ub are respectively formed more than one, more preferably three or more. The reason is that the first substrate 202A can be vibrated more stably.

In the embodiment shown in FIG. 14, the projections 209La, 209Lb and projection 209Ua, 209Ub have a convex shape in which a diameter gradually decreases toward the first substrate 202 form the second substrate 203L or third substrate 203U. There is no limitation on the shape and, the shape may be other shapes such as triangular pyramid, triangular prism and column.

8. Eighth Embodiment

Figure 15:
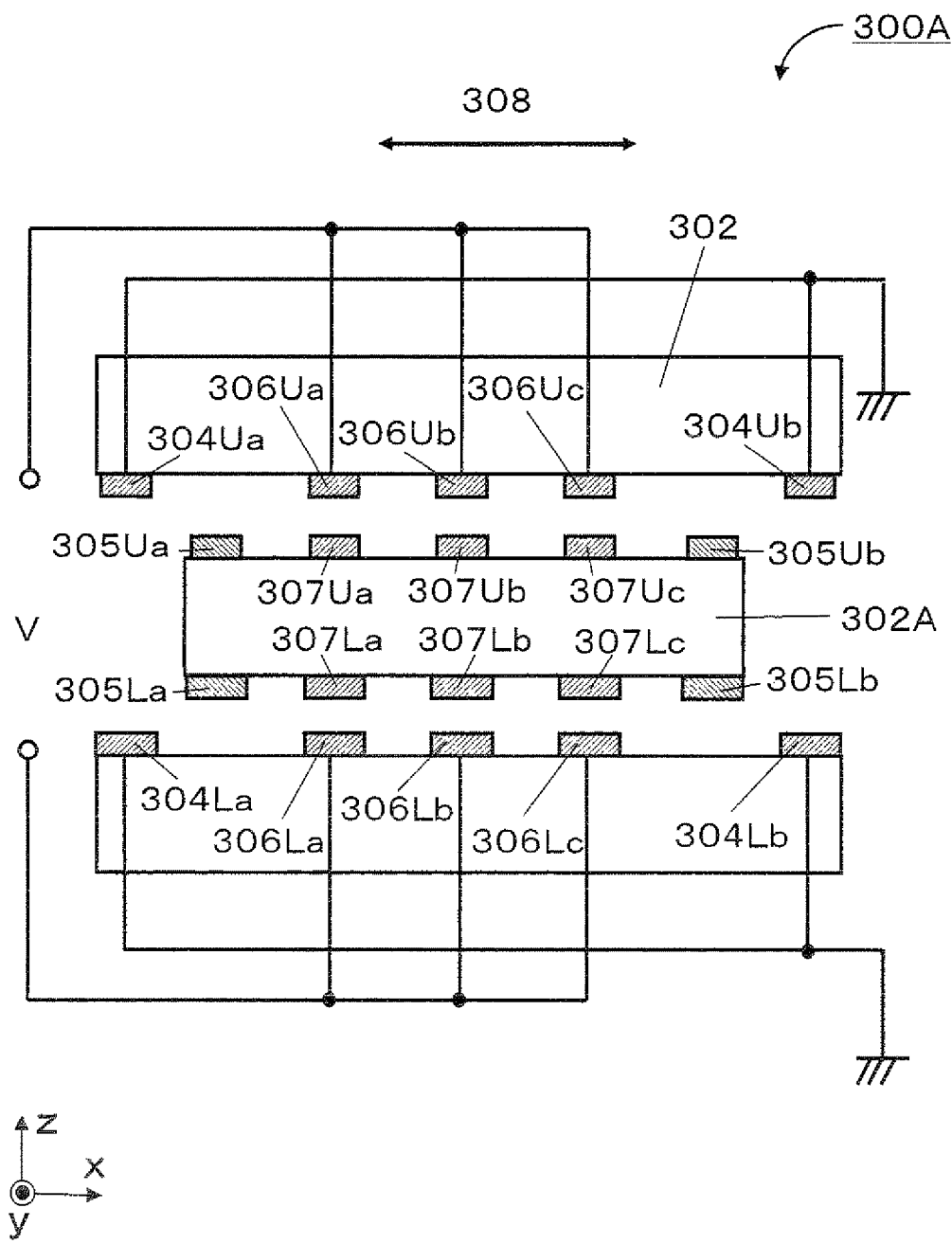
FIG. 15 includes FIG. 15(a) that is a cross-sectional view showing a vibration power generator and FIG. 15(b) that is a cross-sectional view showing the constitution of a fifth electrode, according to an eighth embodiment of the present invention.

FIG. 15 is a cross-sectional view showing a vibration power generator 300A in the third embodiment of the present invention. The vibration power generator in is different from the sixth embodiment in that the size of first electrodes 307La, 307Lb, 307Lc is different from that of fifth electrodes 307Ua, 307Ub, 307Uc, and also the size of third electrodes 305La, 305Ub and fourth electrodes 304La, 504Lb is different from that of seventh electrodes 305Ua, 305Ub and eighth electrodes 304Ua, 504Ub.

Other constitutions are the same as in the sixth embodiment.

The reference symbols with numerals of the 300 mark are used for the respective components shown in FIG. 15 so as to clarify that they are components according to the present embodiment. Unless otherwise specified, the respective components may be identical to the corresponding components of the sixth embodiment denoted by the same reference symbols except for numerals of the hundred's digit.

By constituting the vibration power generator 300A in this way, the following effects can be obtained.

(13) Correction of unbalance in charge storage amount

The item (13) will be further described.

First electrodes 307La, 307Lb, 307Lc, third electrodes 305La, 305Lb and fourth electrodes 304La, 304Lb respectively retain electric charges with the same polarity. Also, fifth electrodes 307Ua, 307Ub, 307Uc, seventh electrodes 305Ua, 305Ub and eighth electrodes 304Ua, 304Ub respectively retain electric charges with the same polarity. While, polarity of electric charges retained by first electrodes 307La, 307Lb, 307Lc, third electrodes 305La, 305Ub and fourth electrodes 304La, 304Lb is different from that of electric charges retained by fifth electrodes 307Ua, 307Ub, 307Uc, seventh electrodes 305Ua, 305Ub and eighth electrodes 304Ua, 304Ub.

Even if electret electrodes have the same size, particularly the same size of the electret that retains electric charges, the amount of electric charges to be retained varies when polarity of electric charges to be retained varies. Therefore, when the size (more specifically, volume of electret of electrodes) of the electrode with different polarity is made identical, the amount of electric charges to be retained varies, and thus imbalance in an electrostatic force and the amount of electric power to be electrically generated arises.

Therefore, as shown in the present embodiment, by changing the electrode size (volume of electret that retains electric charges) so that an electrostatic force generated in the first substrate 302A is substantial identical to the above and under electrodes of the same substrate, imbalance in the charge storage amount can be corrected and also imbalance in the amount of electrical generation doe not arise.

In addition, by changing the size of electrodes formed above and under the first substrate 302A, it is possible to easily distinguish upper and lower of the same substrate and to prevent mistake in the production process, and thus a large production effect is exerted.

In the present embodiment, it is also preferred that second electrodes 306L are formed up to the region that extends over the first electrodes 307L (formed outside first electrodes 307L (first electrodes 307La and 307Lc)). More preferably, second electrodes 306L are formed up to the vibration limit (range where the displacement can be performed by vibration) of the first substrate 302A (particularly, first electrode 307L).

Similarly, it is preferred that sixth electrodes 306U are formed up to the region that extends over the fifth electrodes 307U (formed outside fifth electrodes 307U (fifth electrodes 307Ua and 307Uc). More preferably, sixth electrodes 306U are formed up to the vibration limit (range where the displacement can be performed by vibration) of the first substrate 302A (particularly, fifth electrode 307U).

9. Ninth Embodiment

Figure 16:
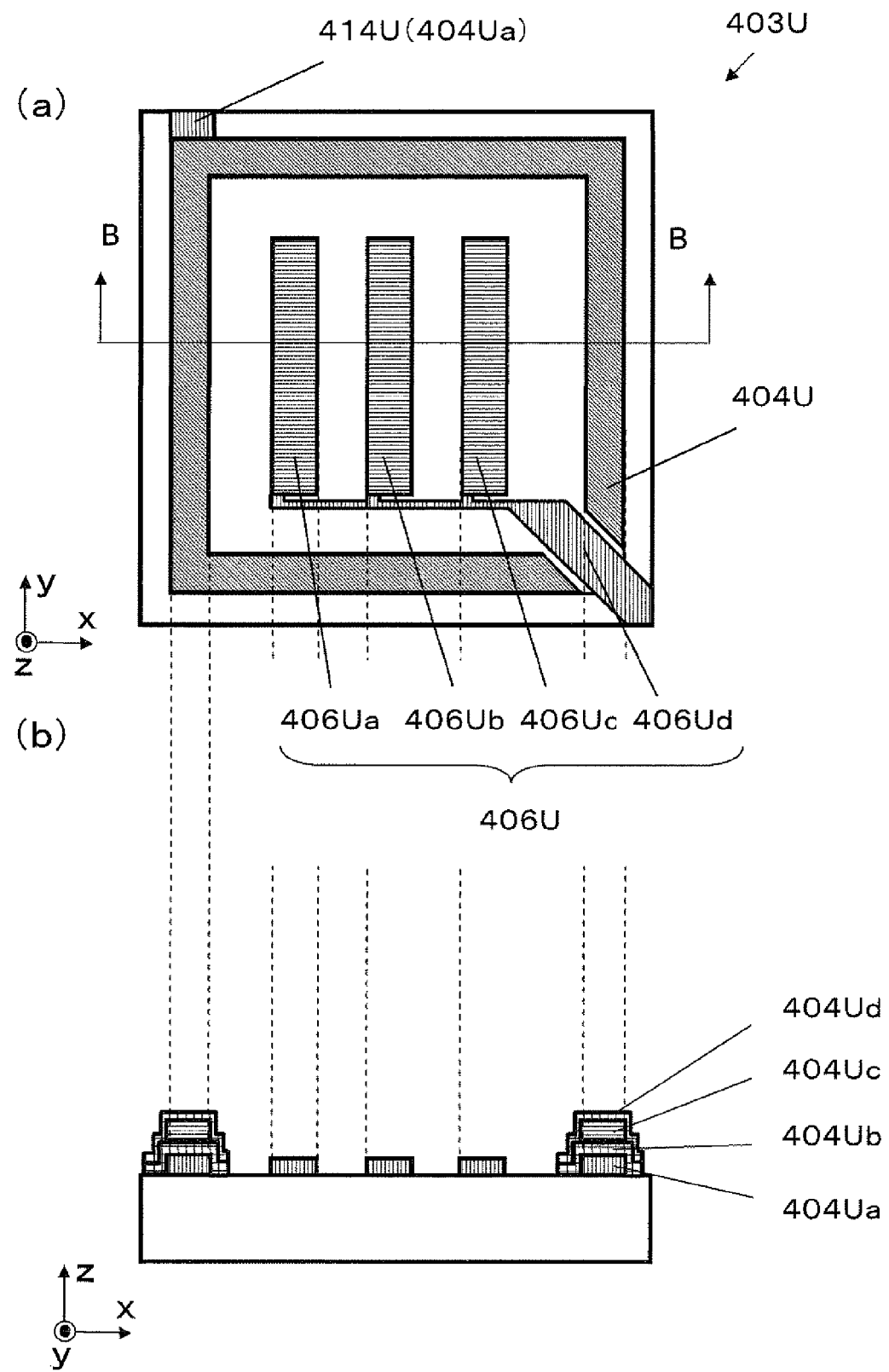
FIG. 16 includes FIG. 16(a) that is a top view showing a third substrate of a vibration power generator and FIG. 16(b) that is a cross-sectional view taken along lines B-B, according to a ninth embodiment of the present invention.

FIG. 16 includes a top view (FIG. 16(a)) showing a third substrate 403U according to a ninth embodiment of the present invention and a cross-sectional view (FIG. 16(b)) taken along lines B-B of the third substrate 403U.

In FIG. 16, eighth electrodes 404U are formed on the periphery of the third substrate 403U. On the third substrate 403U, sixth electrodes 406U are formed. More specifically, not shown in the drawing, sixth electrodes 406Ua, 406Ub, 406Uc are formed at the positions opposite to fifth electrodes (not shown), and are electrically connected by a wiring electrode 406Ud. At this time, a notch is provided at a part of eighth electrodes 404U so that extraction to the outside is performed at least one of four corners of the third substrate 403U.

Electrical connection of an eighth electrode 404U is ground-contacted through an electrode 414U (404Ua).

Herein, the eighth electrode 404U is composed of a conductor 404a, a first insulating material 404b, an electret 404c retaining electric charges, and a second insulating material 404d, similar to FIG. 3.

The operation of the vibration power generator including a third substrate 403U is the same as in other embodiments.

By constituting the third substrate 403U in this way, the following effects can be obtained.

(14) It is possible to decrease an influence of an electrostatic force on a spring force.

The item (14) will be described. In the present embodiment, the sixth electrode 406U is taken out by the end portion of the third substrate 403U.

Whereby, even when the first substrate is displaced in the x-axis direction or the y-axis direction, it becomes possible to return the first substrate to the original position without impairing an electrostatic force by the eighth electrode 404U arranged along the periphery of the third substrate 403U.

Even when the first substrate is displaced in an oblique direction (for example, direction at 45° from x-axis and y-axis), it becomes possible to return the first substrate to a desired position by the eighth electrode 404U arranged at four sides of the third substrate 403U. In this way, by taking out the electrode at the region where the smallest effect of an electrostatic force is exerted, it becomes possible to take out the electrode without decreasing a spring force (restoring force).

In FIG. 16, three electrodes (406Ua, 406Ub, 406Uc) are described as the sixth electrode 406U, and the same effect can be obtained even when the sixth electrode 406U is composed of a lot of strip-shaped electrodes. By composing a plurality of more sixth electrodes, the effect capable of outputting much electric by the displacement of the first substrate is obtained.

Such a constitution of the third substrate 403U according to the present embodiment can also be applied to the second substrate. The vibration power generator, which includes a fourth electrode with the same constitution as that of the eighth electrode 404U and a second electrode with the same constitution as that of the sixth electrode 406U and optionally includes the second substrate including an electrode with the same constitution as that of the electrode 414U for electrical connection of the second electrode, is included in the present embodiment, as a matter of course.

10. Tenth Embodiment

Figure 17:
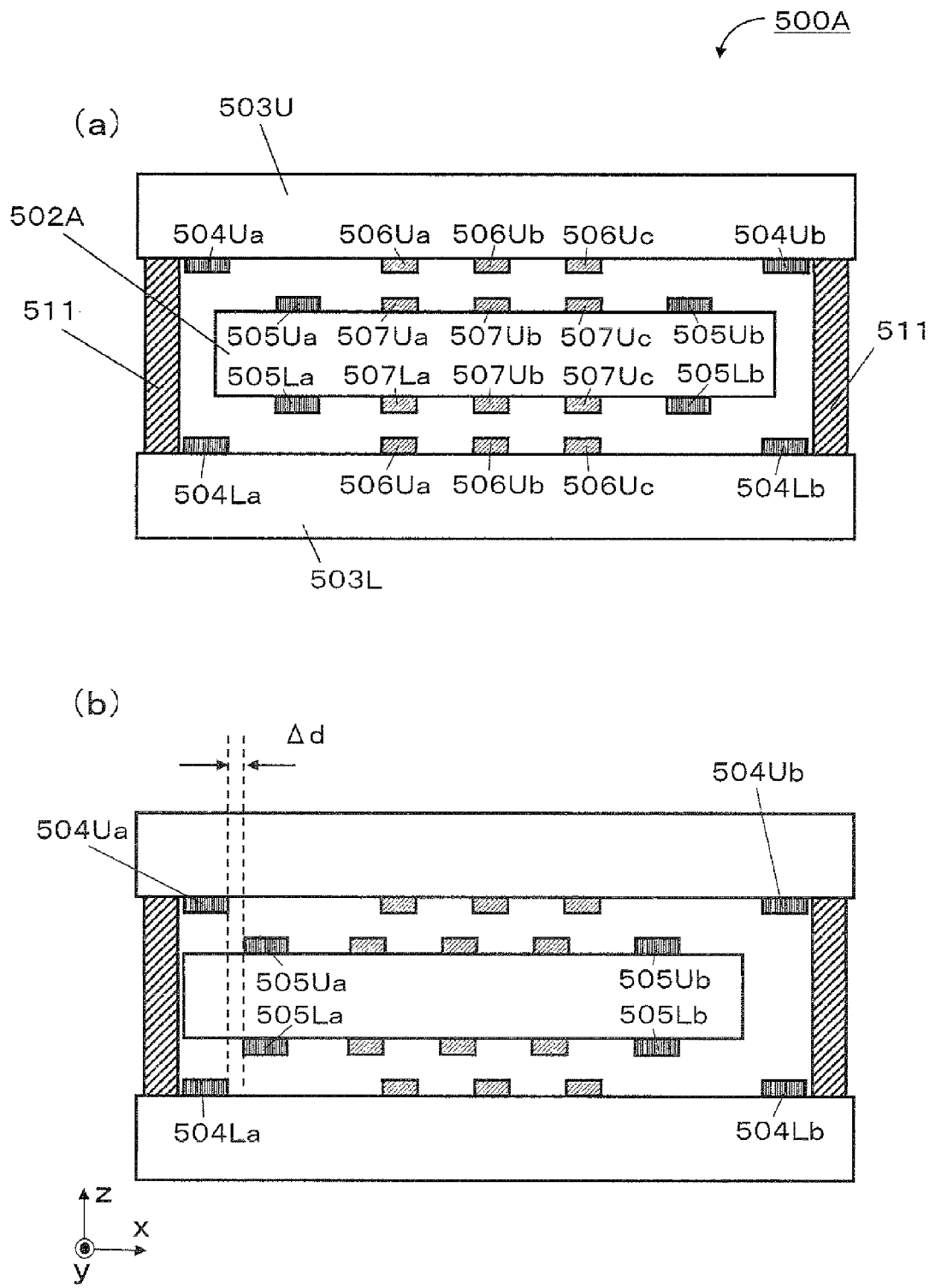
FIG. 17 is a cross-sectional view showing a vibration power generator according to a tenth embodiment of the present invention.

FIG. 17 includes a cross-sectional view (FIG. 17(a)) showing a vibration power generator 500A according to the tenth embodiment of the present invention and a cross-sectional view (FIG. 17(b)) showing the vibration power generator 500A in a state where the first substrate 502A is displaced.

The reference symbols with numerals of the 500 mark are used for the respective components shown in FIG. 17 so as to clarify that they are components according to the present embodiment. Unless otherwise specified, the respective components may be identical to the corresponding components of the sixth to ninth embodiments denoted by the same reference symbols except for numerals of the hundred's digit.

In FIG. 17(a), a third substrate 503U is fixed above a second substrate 503L using a support 511. A first substrate 502A is arranged between the third substrate 503U and the second substrate 503L, and between two supports 511, while having a space above and below thereof. That is, the first substrate 502A is arranged so as to float between the third substrate 503U and the second substrate 503L (separated from third substrate 503U and second substrate 503L).

Similarly to the sixth embodiment, the first substrate 502A is retained by an electrostatic force acting between third electrodes 505La, 505Lb formed on a lower surface of the first substrate 502A and fourth electrodes 504La, 504Lb formed on an upper surface of the second substrate 503L, and an electrostatic force acting between seventh electrodes 505Ua, 505Ub formed on an upper surface of the first substrate 502A and eighth electrodes 504Ua, 504Ub formed on a lower surface of the third substrate 503U.

Herein, the descriptions of wirings and projections are omitted for simplification.

The first substrate 502A can be displaced in the x-axis direction and the displacement (vibration) range is controlled by two supports 511. That is, the first substrate 502A can be displaced up to the position where one end portion of the first substrate 502 is contacted with the support 511.

The fourth electrodes 504La, 504Lb are formed in the vicinity (vicinity of an end face of the second substrate 503L) of the support 511. The third electrodes 505La, 505Lb are formed in the vicinity of an end face of the first substrate 502A and formed through a predetermined region from the end face.

While the first substrate 502A vibrates and displaces between two supports 511, the third electrodes 505La, 505Lb are formed so as not to overlap with the fourth electrodes 504La, 504Lb (the third electrodes 505La, 505Lb are always located inside the fourth electrodes 504La, 504Lb in the x-axis direction). That is to say, the region provided at the end face of the first substrate 502A (length in the x-axis direction) is formed in the size larger than the size (length in the x-axis direction) of the fourth electrodes 504La, 504Lb.

Similarly, the eighth electrodes 504Ua, 504Ub are formed in the vicinity (vicinity of an end face of the third substrate 503U) of the support 511. The seventh electrodes 505Ua, 505Ub are formed in the vicinity of an end face of the first substrate 502A through a predetermined region from the end face.

While the first substrate 502A vibrates and displaces between two supports 511, the seventh electrodes 505Ua, 505Ub are formed so as not to overlap with the eighth electrodes 504Ua, 504Ub (the seventh electrodes 505Ua, 505Ub are always located inside the eighth electrodes 504Ua, 504Ub in the x-axis direction). That is to say, the region provided at the end face of the first substrate 502A is formed in the size (length in the x-axis direction) larger than the size (length in the x-axis direction) of the eighth electrodes 504Ua, 504Ub.

The operation of the vibration power generator 500A thus formed will be described.

The vibration power generator 500A performs electrical generation by displacing the first substrate 502A with respect to the second substrate 503L and the third substrate 503U by vibration from the outside. In that case, the first substrate 502A is displaced by vibration from the outside. However, even when displaced to a maximum degree between two supports 511, the third electrodes 505La, 505Lb and the fourth electrodes 504La, 504Lb including a film retaining electric charges do not overlap and the seventh electrodes 505Ua, 505Ub and the eighth electrodes 504Ua, 504Ub do not overlap. Therefore, the first substrate 502 is subjected to a force in the direction opposite to the displacement by an electrostatic force.

As used herein, third electrodes 505La, 505Lb and fourth electrodes 504La, 504Lb do not overlap means that third electrodes 505La, 505Lb and fourth electrodes 504La, 504Lb do not completely overlap.

That is, as shown in FIG. 17(b), even when the displacement of the first substrate 502 becomes maximum, a distance Δd between an end portion of the third electrodes and an end portion of the fourth electrodes (end portion of a third electrode 505La and end of a fourth electrode 504La in FIG. 17(b)) in the x direction satisfies the inequality expression: Δd>0.

Similarly, a distance Δd between an end portion of the seventh electrodes and an end portion of the eighth electrodes in the x direction satisfies the inequality expression: Δd>0.

By constituting the vibration power generator 500A in this way, the following effects can be obtained.

(15) It is possible to perform large amplitude operation in a low frequency region.

The item (15) will be described.

The third electrodes 505La, 505Lb and the seventh electrodes 505Ua, 505Ub are formed from the end face of the first substrate 502A through a given region (at a given distance), and the electrode arrangement is different from those of the six to tenth embodiments. In the above embodiment, it is necessary to prevent the first substrate from displacing up to the end face of the space by setting a spring force (electrostatic force) at a larger value so as to ensure an electrostatic force. As a result, it is necessary to increase the spring force to some extent.

By constituting like the present embodiment, the third electrodes 505La, 505Lb and the fourth electrodes 504La, 504Lb do not overlap and the seventh electrodes 505Ua, 505Ub and the eighth electrodes 504Ua, 504Ub do not overlap even when the first substrate 502A performs a large amplitude operation by decreasing an electrostatic force. Therefore, an electrostatic force is generated in a direction opposite to the displacement (accurately, direction of vector sum of a second substrate direction (x-axis direction) and a direction perpendicular thereto (z-axis direction)). Therefore, a decrease in a spring force (electrostatic force) enables a large amplitude operation in a lower frequency region, thus enabling electrical generation.

The vibration power generator 500A can perform electrical generation even by providing third electrodes 505L (505La, 505Lb) and fourth electrode 504L (504La, 504Lb) without providing seventh electrodes 505U (505Ua, 505Ub) and eighth electrodes 504U (504Ua, 504Ub) and acting an electrostatic force on the lower side of the first substrate 502A.

The embodiment in which an electrode capable of generating a restoring force is provided only at one side of the first substrate 502A is included in the present embodiment as a matter of course.

Figure 18:
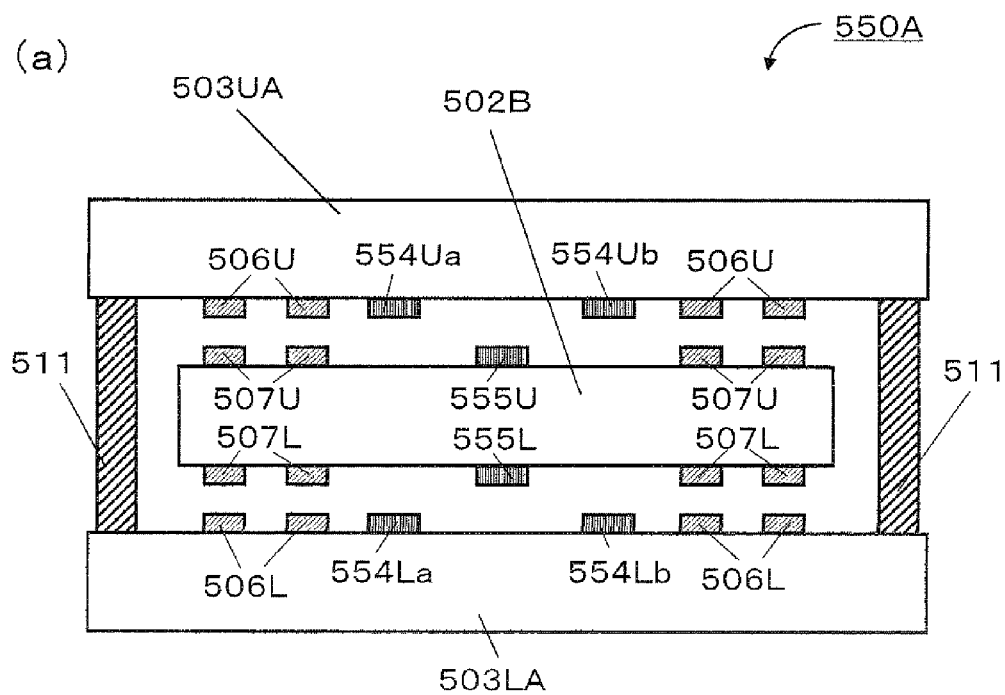
FIG. 18 is a cross-sectional view showing another constitution of a vibration power generator according to the tenth embodiment of the present invention.
Figure 18:
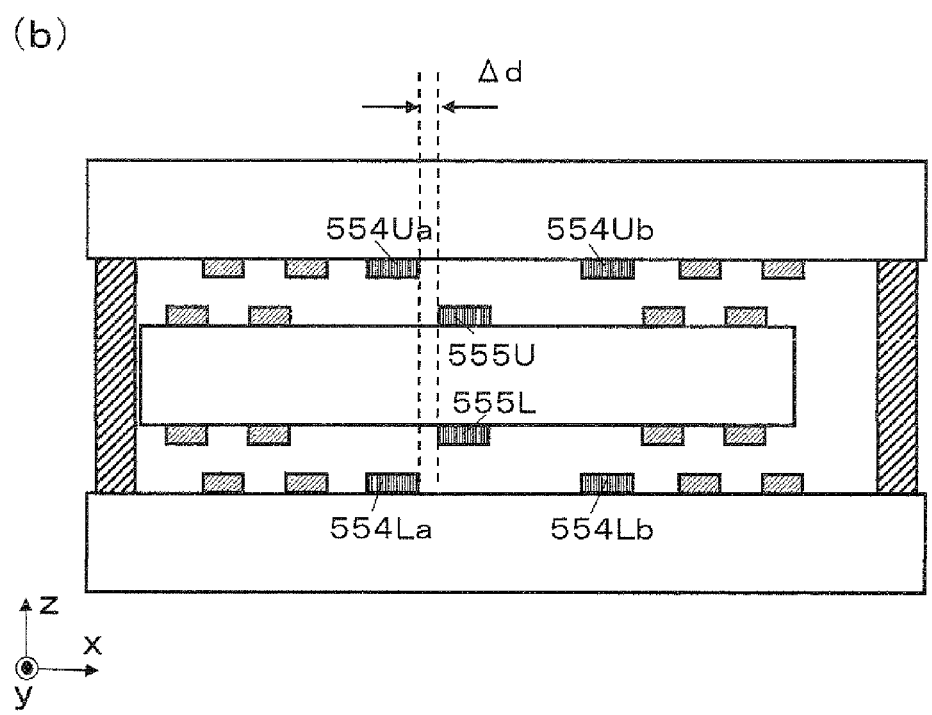

FIG. 18 includes a cross-sectional view (FIG. 18(a)) showing another vibration power generator 550A according to the tenth embodiment of the present invention and a cross-sectional view (FIG. 18(b)) showing the vibration power generator 550A in a state where a first substrate 502B is displaced.

In the embodiment shown in FIG. 17, the region capable of generating an electrostatic force is provided on the periphery (in the vicinity of an end portion) of the first substrate 502A. In the embodiment shown in FIG. 18, a third electrode 555L and fourth electrode 554La, 554Lb are respectively provided in the center (center in the x-axis direction) of a lower surface of the first substrate 502B and the center of an upper surface of the second substrate 503LA. Furthermore, a seventh electrode 555U and eighth electrodes 554Ua, 554Ub are respectively provided in the center (center in the x-axis direction) of an upper surface of the first substrate 502B and the center of a lower surface of the third substrate 503UA.

Such an embodiment is also included in the present embodiment.

Also in this case, even when the first substrate 502B performs maximum displacement between two supports 511, by designing so that a third electrode 555L and fourth electrodes 554La, 554Lb do not overlap, and a seventh electrode 555U and eighth electrodes 554Ua, 554Ub do not overlap, the same effect as in the vibration power generator 500A can be obtained.

Furthermore, the embodiment shown in FIG. 18 has an advantage that the number of the third electrode 555L and that of the seventh electrode 555U can be respectively set at one.

If necessary, a plurality of third electrodes 555L and/or seventh electrodes 555U may be arranged in the center of the substrate 502A.

In the embodiment shown in FIG. 18, for example, by providing a third electrode 555L and a fourth electrode 554L without providing a seventh electrode 555U and an eighth electrode 554U, and acting an electrostatic force only at the lower side of the first substrate 502B, the vibration power generator 550A can perform electrical generation.

The embodiment in which an electrode capable of generating a restoring force is provided only at one side of the first substrate 502B is included in the present embodiment, as a matter of course.

11. Eleventh Embodiment

Figure 19:
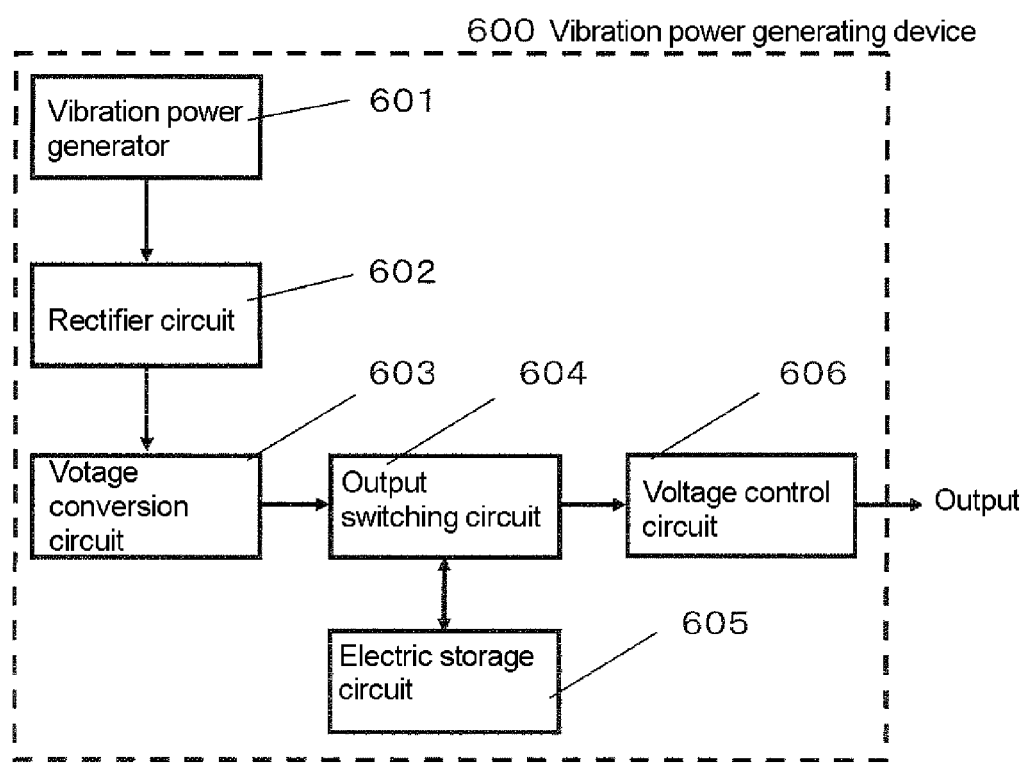
FIG. 19 is a block diagram showing a vibration power generating device according to an eleventh embodiment of the present invention.

As the eleventh embodiment of the present invention, a vibration power generating device will be described. FIG. 19 is a block diagram showing a vibration power generating device 600 according to the present embodiment. A vibration power generator 601 shown in FIG. 19 is any one of vibration power generators shown in the first embodiment to the tenth embodiment.

In FIG. 19, the vibration power generating device 600 is composed of a vibration power generator 601, a rectifier circuit 602, a voltage conversion circuit 603, an output switching circuit 604, an electric storage circuit 605 and a voltage control circuit 606. An AC voltage outputted from the vibration power generator 601 is converted into a DC voltage by the rectifier circuit 602. The DC voltage is inputted into the voltage conversion circuit 603 and then voltage-converted to an output voltage level of the vibration power generating device 600. The converted voltage is inputted into the voltage control circuit 606 or the electric storage circuit 605 by the output switching circuit 604. In the voltage control circuit 606, the voltage is controlled so as to make an output voltage constant and then outputted.

The operation of the vibration power generating device 600 constituted as described above will be described with reference to FIG. 20.

Figure 20:
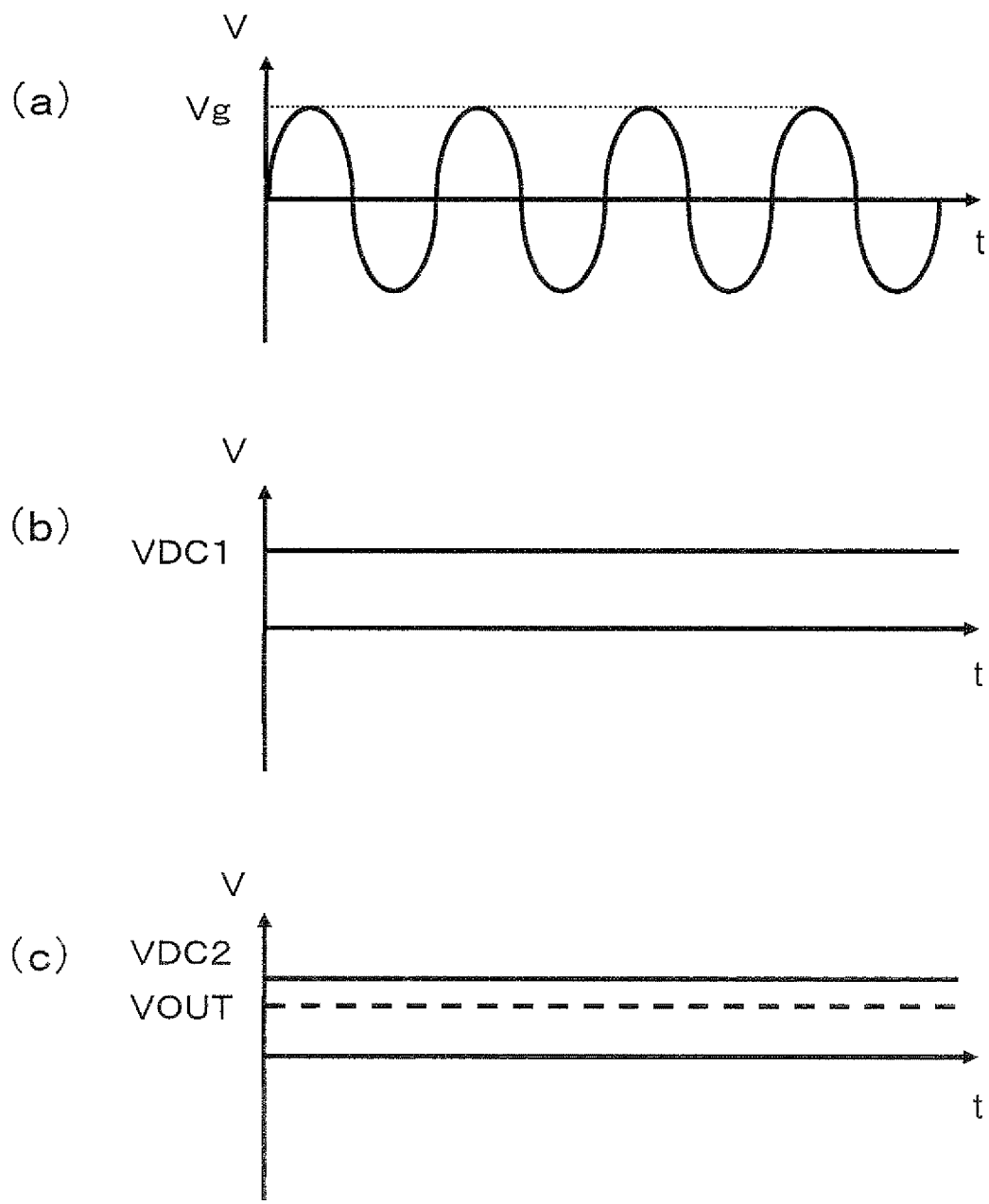
FIG. 20 is a view showing a voltage waveform of each portion of a vibration power generating device according to the eleventh embodiment of the present invention.

FIG. 20 shows a voltage waveform of each portion of the vibration power generating device 600, and FIG. 20(*a*) shows an output voltage wavelength of the vibration power generator 601. In the present embodiment, assuming that electrical generation is efficiently performed at the position where the displacement direction of the first substrate varies for simplification, and a sinusoidal voltage is outputted by the increase and decrease of the overlapping area through vibration. Herein, with respect to an output voltage of the vibration power generator 601, voltage swing Vg varies depending on a vibrating amplitude of a first substrate, a gap between a first substrate and a second substrate, the amount of electric charges retained by an electret film, and the magnitude of an external impedance. An AC voltage outputted from the vibration power generator 601 is converted into a DC voltage VDC1 by the rectifier circuit 602 (FIG. 20(*b*)). VDC1 is voltage-converted to an output voltage level VDC2 of the vibration power generating device 600 in the voltage conversion circuit 603. With respect to the operation of the output switching circuit 604, when voltage output from the vibration power generating device 600 is not required, a voltage is not outputted to the voltage control circuit 606 and generated electric power is stored in the electric storage circuit 605. When voltage output from the vibration power generating device 600 is required and the amount of electrical generation is small, switching is performed so as to output electric power stored in the electric storage circuit 605. With respect to output from the output switching circuit 604, output is performed by controlling to a desired output voltage VOUT by the voltage control circuit 606 (FIG. 20(*c*)).

As described above, the output voltage of the vibration power generator 600 varied depending on various factors. To cope with variation, it is desired that VDC2 is set at a voltage that is slightly higher than the voltage VOUT to be outputted finally. It becomes possible to make the output voltage constant by performing such setting even when micro voltage variation occurs. Description is made by the case of outputting 1.8 V. In case VDC2 is set at 1.8 V, an output voltage of the vibration power generator 600 decreases when the output voltage of the vibration power generator decreases. However, when VDC2 is set at 2 V, it becomes possible to sufficiently control even if a decrease in voltage by 0.2 V happens, and thus a large utilization effect is exerted.

Figure 21:
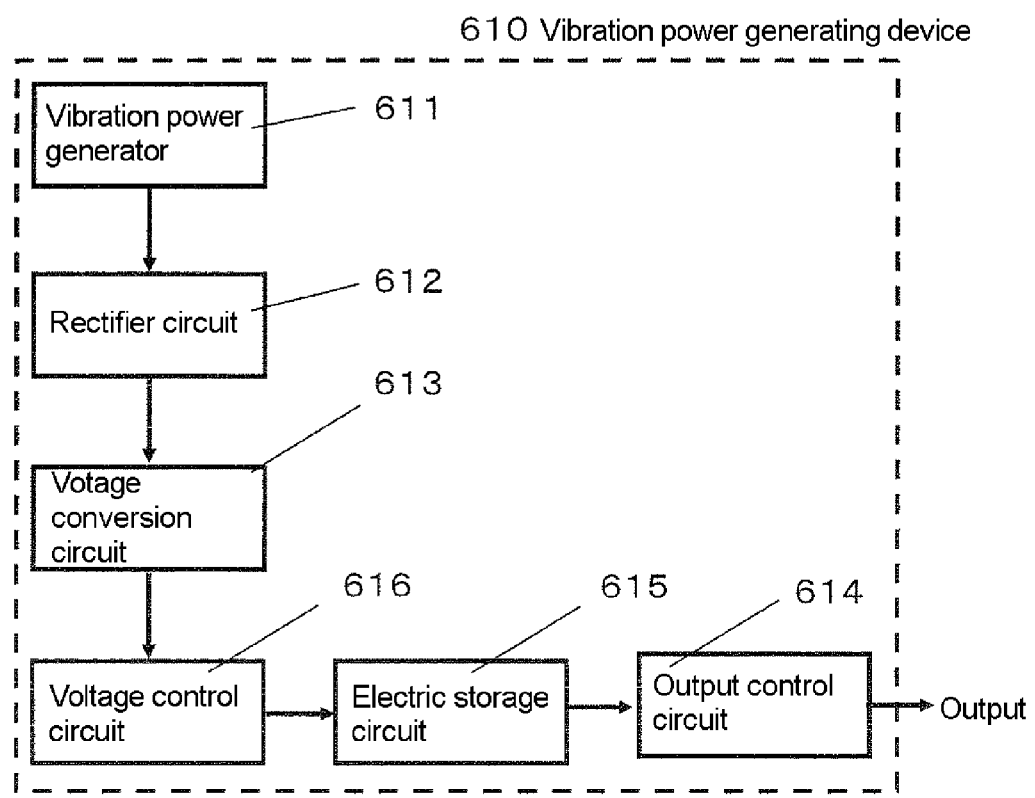
FIG. 21 is a block diagram showing another constitution of a vibration power generating device according to the eleventh embodiment of the present invention.

FIG. 21 is a block diagram showing a vibration power generating device 610 having another structure according to the present embodiment.

In FIG. 21, the vibration power generator 610 is a vibration power generator shown in any one of the first embodiment to the tenth embodiment.

The vibration power generating device 610 is composed of a vibration power generator 611, a rectifier circuit 612, a voltage conversion circuit 613, an output switching circuit 614, an electric storage circuit 615 and a voltage control circuit 616. An AC voltage outputted from the vibration power generator 611 is converted into a DC voltage by the rectifier circuit 612. The DC voltage is inputted into the voltage conversion circuit 613, voltage-converted to a voltage level that can be controlled by the vibration power generating device 610. The converted voltage is controlled by the voltage control circuit 606 so as to become a desired voltage, and then inputted into the electric storage circuit 615. In the output control circuit 614, the electric power stored in the electric storage circuit 615 is output-controlled according to a state of load.

Also, in the vibration power generating device 610 with such constitution, the same effect as in the vibration power generating device 600 is obtained, as a matter of course.

The operation of the vibration power generating device 610 is generally the same as that of the vibration power generating device 600. The output voltage of the voltage control circuit 616 is set so as to be controlled to an optimum voltage to the electric storage circuit 615. In the output control circuit 614, output from the vibration power generating device 610 is controlled according to a state of load.

12. Twelfth Embodiment

Figure 22:
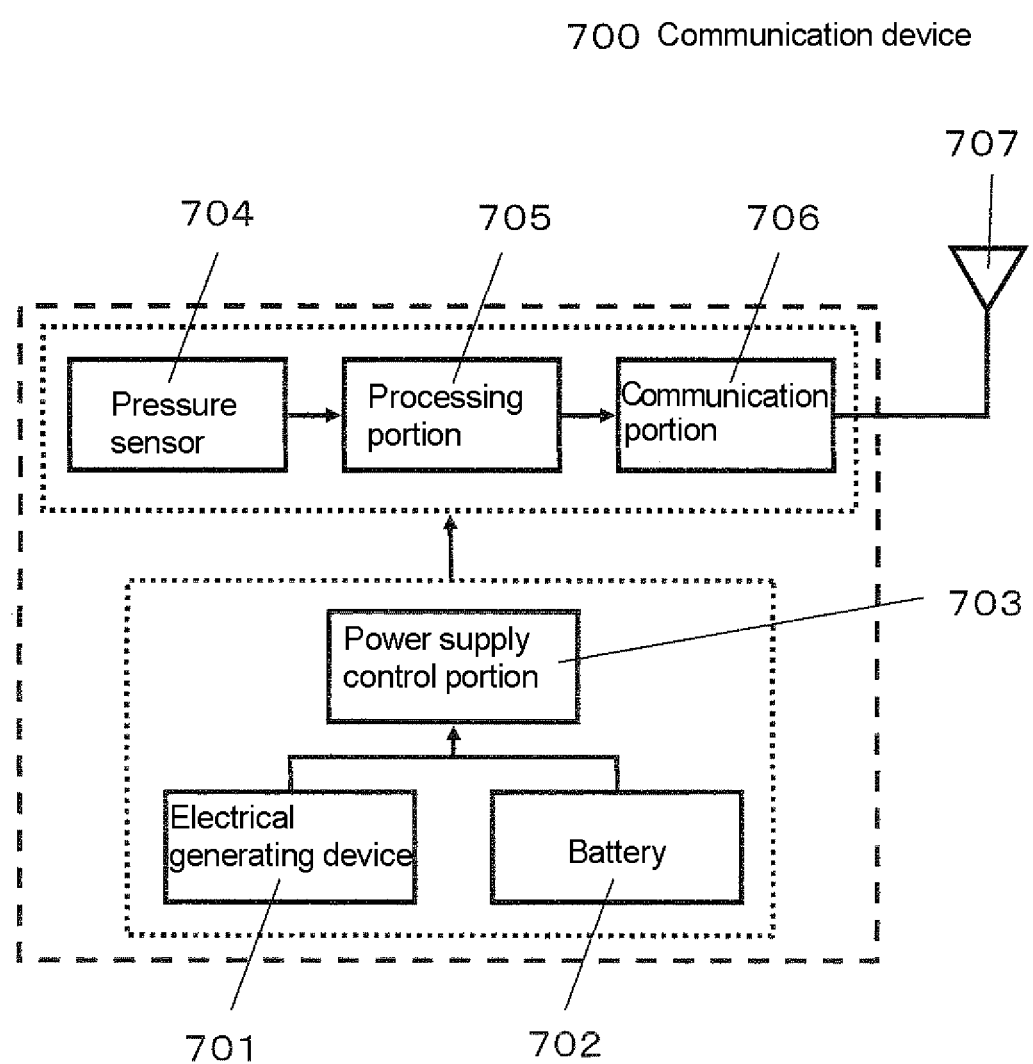
FIG. 22 is a view showing a communication device using a vibration power generating device according to a twelfth embodiment of the present invention.

FIG. 22 is a block diagram showing a communication device 700 used in a tire pneumatic pressure monitoring system that is provided in an automobile. In FIG. 22, an electrical generating device 701 is a vibration power generating device shown in the eleventh embodiment In FIG. 22, the communication device 700 is composed of an electrical generating device 701 that performs electrical generation by vibration, a battery 702 as a main power supply of the communication device or a sub power supply of the electrical generating device 701, a control portion 703 that switches an output from the electrical generating device 701 and an output from the battery 702 and supplied to the circuit portion, a pressure sensor 704 that measures a tire pneumatic pressure, a processing portion 705 that processes an output from the pressure sensor and transmits to a communication portion, a communication portion 706 that convert input signal from the processing portion 705 into high frequency signal and transmit the signal to an antenna 707, and the antenna 707.

The operation of the communication device 700 constituted above will be described.

Electric power required to operate a pressure sensor 704, a processing portion 705 and a communication portion 706 is supplied from an electrical generating device 701 or a battery 702 by a power supply control portion 703. Using a pressure sensor 704, a tire pneumatic pressure is measured and the measurement results are converted into voltage signal and the signal is inputted into the processing portion 705. The signal processed in the processing portion 705 is inputted into the communication portion 706 and then propagated as high frequency signal from an antenna 707.

In this way, when the vibration power generating device is employed as a power supply of a communication device, it is possible to decrease the number of maintenance works such as battery exchanges or eliminate battery exchanges, and a large utilization effect is exerted.

In the present embodiment, the example of using a vibration power generating device and a battery in combination is shown. When electric power consumed in circuits of a pressure sensor, a processing portion, a communication portion and the like, and electric power required to communication can be sufficiently covered with output electric power from the vibration power generating device, only the vibration power generating device may be used. In that case, a battery and power supply control portion becomes unnecessary, and thus it is effective in view of miniaturization of a device.

Furthermore, in the present embodiment, the example using a vibration power generator and a vibration power generating device shown in the first embodiment to the eleventh embodiment is shown. As long as it is a vibration power generator capable of converting vibration from the outside into electric power, the same effect can be obtained even when the other vibration power generator is used, as a matter of course.

Furthermore, in the present embodiment, the example using a vibration power generator and a vibration power generating device shown in the first embodiment to the eleventh embodiment is shown. As long as it is a vibration power generator capable of converting vibration from the outside into electric power, the same effect can be obtained even when the other vibration power generator is used, as a matter of course.

13. Thirteenth Embodiment

Figure 23:
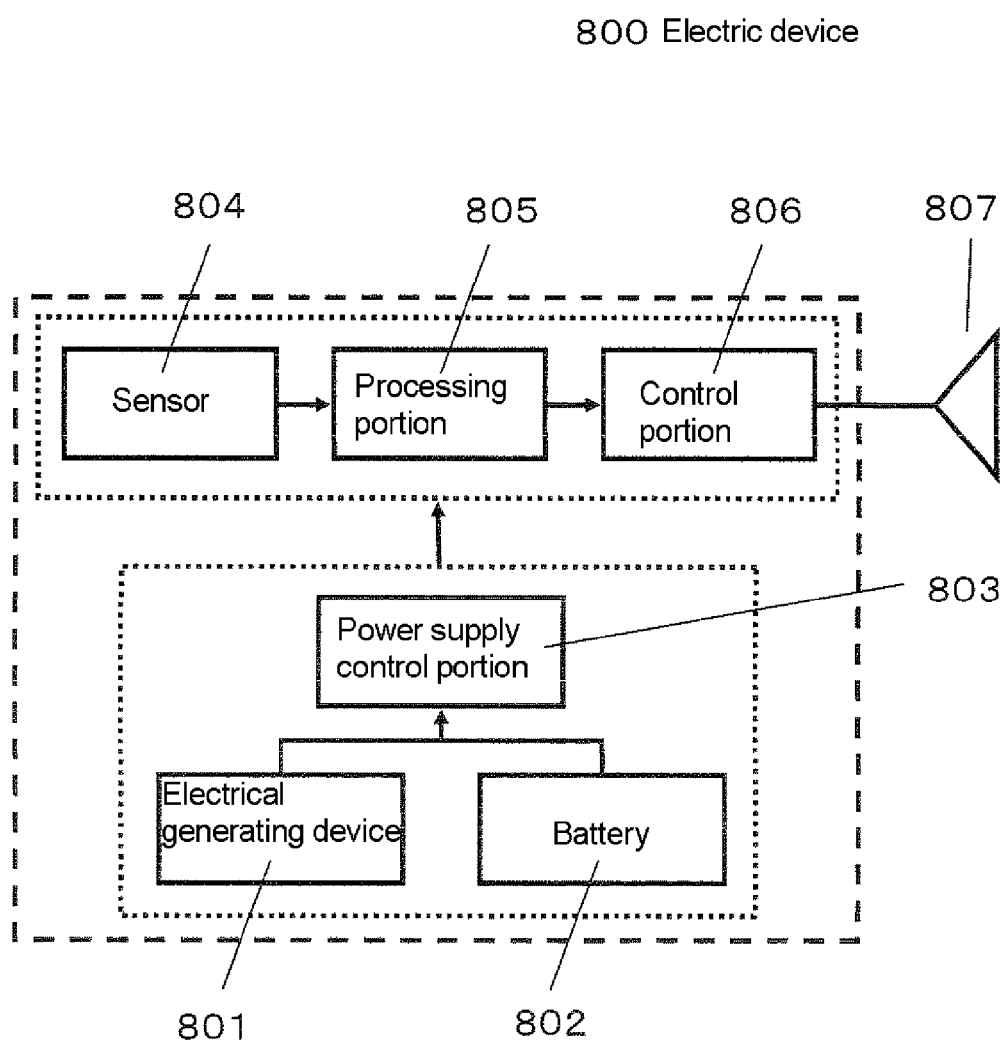
FIG. 23 is a view showing an electronic device using a vibration power generating device in a thirteenth embodiment of the present invention.
Figure 24:
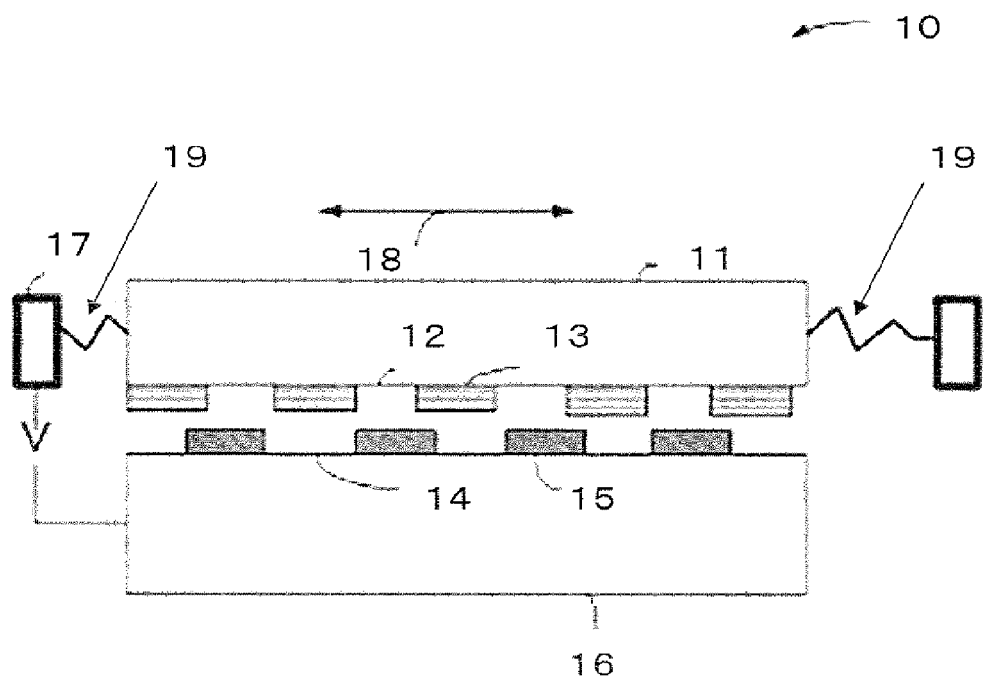
FIG. 24 is a cross-sectional view showing a conventional electrostatic induction vibration power generator.
Figure 25:
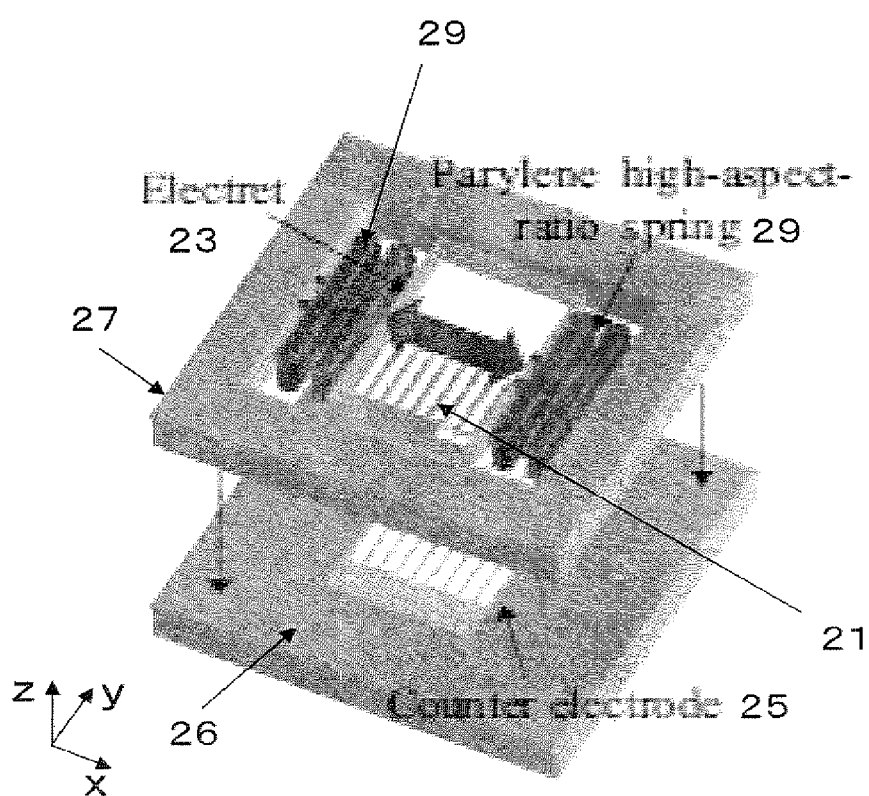
FIG. 25 is a perspective view showing an electrostatic induction vibration power generator using conventional resin springs

FIG. 23 is a block diagram showing an electronic device 800 emitting sound that is mounted in toys. In FIG. 23, an electrical generating device 801 is a vibration power generating device shown in the eleventh embodiment.

In FIG. 23, the electronic device 800 is composed of an electrical generating device 801 that performs electrical generation by vibration, a battery 802 as a main power supply of a communication device or as a sub power supply of the electrical generating device 801, a power supply control portion 803 that switches an output from the electrical generating device 801 and an output from the battery 802 and supplies to the circuit portion, a sensor 804 that detects response from the outside (for example, button push, gradient, etc.), a processing portion 805 that processed an output from a sensor and transmits to the communication portion, a control portion 806 that transmits to a speaker 807 by input signal from the processing portion 805, and the speaker 807.

The operation of communication device (electronic device) 800 constituted as described above will be described.

Electric power required to operate the sensor 804, the processing portion 805 and the control portion 806 is supplied from the electrical generating device 801 or the battery 802 by the power supply control portion 803. The sensor 804 detects response from the outside and inputs the detection results into the processing portion 805. When signal processed in the processing portion 805 exceeds a desired value, the signal is inputted into the control portion 806 and sound is outputted from the speaker 807.

In this way, when the vibration power generating device is employed as a power supply of an electric device, it is possible to decrease the number of maintenance works such as battery exchanges or eliminate battery exchanges, and a large utilization effect is exerted.

Also, in the present embodiment, the example of using a vibration power generating device and a battery in combination is shown. When electric power consumed in circuits of a pressure sensor, a processing portion, a communication portion and the like, and electric power required to communication can be sufficiently covered with output electric power from the vibration power generating device, only the vibration power generating device may be used. In that case, a battery and power supply control portion becomes unnecessary, and thus it is effective in view of miniaturization of a device.

Also, in the present embodiment, the example using a vibration power generator and a vibration power generating device shown in the first embodiment to the eleventh embodiment is shown. As long as it is a vibration power generator capable of converting vibration from the outside into electric power, the same effect can be obtained even when the other vibration power generator is used, as a matter of course.

It should be noted that examples disclosed herein are in all respects merely exemplified, and are not intended to be limiting. The scope of the present invention is shown by, not the above-described explanation, but the scope of claims, and is intended to encompass all modifications within the spirit and scope equal to the scope of claims.

The present application claims priority on Japanese Patent Application No. 2009-275612 and Japanese Patent Application No. 2009-293721, the disclosure of which is incorporated by reference herein.

The vibration power generator of the present invention can perform a large amplitude operation of first substrates and electrical generation of external vibration in a low frequency region, and also can improve reliability by eliminating a spring accompanying elastic strain, and therefore the vibration generator of the present invention is useful as a static induction vibration power generator. Further, the vibration generator of the present invention is extremely useful for usage of low electric power wireless communication modules, other electronic devices and the like.

What is claimed is:

1. A vibration power generator comprising:
    a first substrate;
    a first electrode arranged on the first substrate;
    a second substrate spaced from and opposite to the first substrate; and
    a second electrode arranged on the second substrate, the first electrode vibrating with respect to the second substrate, any one of the first electrode and the second electrode including a film retaining electric charges,
    the vibration generator further comprising:
    a third electrode including a film retaining electric charges and arranged on the first substrate; and
    a fourth electrode including a film retaining electric charges and arranged on the second substrate, the third electrode and the fourth electrode being arranged so that the first substrate is retained in a predetermined position when an external force does not act on the first substrate, while an electrostatic force returning the first substrate to a predetermined position acts when an external force acts on the first substrate and the first substrate moves with respect to the second substrate,
    wherein the film retaining electric charges included in any one of the first electrode or the second electrode, the film retaining electric charges included in the third electrode, and the film retaining electric charges included in the fourth electrode retain electric charges with the same polarity.

2. The vibration power generator according to claim 1, further comprising a regulating member defining an amplitude of the vibration of the first substrate, wherein
    the third electrode is arranged in the vicinity of an end face of the first substrate, and
    the fourth electrode is arranged in the vicinity of an end face of the second substrate, and at a position so that the third electrode and the fourth electrode do not overlap during the vibration of the first substrate.

3. The vibration power generator according to claim 1, further comprising a regulating member defining an amplitude of the vibration of the first substrate, wherein
    the third electrode is arranged on a center of the first substrate, and
    the fourth electrode is arranged at a center of the second substrate, and at a position so that the third electrode and the fourth electrode do not overlap during the vibration of the first substrate.

4. The vibration power generator according to claim 1, further comprising a projection having one end fixed on the second substrate, and the other end contacted with the first substrate thereby electrically connecting to the first substrate.

5. The vibration power generator according to claim 4, further comprising:
a third substrate facing an opposite surface of the first substrate facing the second substrate, and separated from the first substrate; and
a second projection having one end fixed on the third substrate, and the other end contacted with the first substrate thereby electrically connecting to the first substrate.

6. The vibration power generator according to claim 5, wherein the third substrate is supported by a support formed on the second substrate, and the support defines an amplitude of the vibration of the first substrate.

7. The vibration power generator according to claim 4, wherein the first electrode and the third electrode are composed of a first film retaining electric charges formed on the first substrate, and an insulating material formed to cover the first film.

8. The vibration power generator according to claim 1, further comprising:
a third substrate spaced from the first substrate and opposite to one surface of the first substrate;
a fifth electrode arranged on the one surface of the first substrate; and
a sixth electrode arranged on the third substrate so as to face the fifth electrode, wherein
the first substrate vibrates with respect to the third substrate, and the second substrate faces the other surface of the first substrate,
the first electrode and the third electrode are arranged on the other surface of the first substrate, and
any one of the fifth electrode and the sixth electrode includes a film retaining electric charges.

9. The vibration power generator according to claim 8, further comprising:
a seventh electrode arranged on the one surface of the first substrate and including a film retaining electric charges; and
an eighth electrode arranged on the third substrate and including a film retaining electric charges, wherein
the seventh electrode and the eighth electrode are arranged so that the first substrate is retained at a predetermined position when an external force does not act on the first substrate, while an electrostatic force returning the first substrate to a predetermined position acts when an external force acts on the first substrate and the first substrate moves with respect to the second substrate.

10. The vibration power generator according to claim 9, wherein the film retaining electric charges included in one of the fifth electrode or the sixth electrode, the film retaining electric charges included in the seventh electrode, and the film retaining electric charges included in the eighth electrode retain electric charges with the same polarity.

11. The vibration power generator according to claim 9, comprising two pairs of the third electrode and the fourth electrode, wherein two pairs of the third electrode and the fourth electrode are arranged so that a component parallel to the first substrate of an electrostatic force acting between electrodes of one pair of the third electrode and the fourth electrode, and a component parallel to the first substrate of an electrostatic force acting between electrodes of the other pair of the third electrode and the fourth electrode face an opposite direction; and
further comprising, two pairs of the seventh electrode and the eighth electrode, wherein two pairs of the seventh electrode and the eighth electrode are arranged so that a component parallel to the first substrate of an electrostatic force acting between electrodes of one pair of the seventh electrode and the eighth electrode, and a component parallel to the first substrate of an electrostatic force acting between electrodes of the other pair of the seventh electrode and the eighth electrode face an opposite direction.

12. The vibration power generator according to claim 9, wherein the first electrode includes a film retaining the electric charges,
the second electrode includes a film retaining the electric charges, and
the first electrode, the second electrode, the third electrode and the seventh electrode include an insulating material covering a film retaining electric charges formed on the first substrate, and a film retaining the electric charges.

13. The vibration power generator according to claim 8, further comprising a projection having one end fixed to the second substrate or the third substrate, and the other end contacted with the first substrate.

14. A vibration power generating device comprising:
the vibration power generator according to claim 1; and
a rectifier circuit rectifying an AC output voltage from the vibration power generator thereby converting the AC output voltage into a DC voltage.

15. The vibration power generating device according to claim 14, further comprising:
a voltage conversion circuit converting the DC voltage output from the rectifier circuit to be a predetermined voltage level;
an electric storage circuit storing electric power generated by the vibration power generator in the case where an output from the vibration power generating device is unnecessary;
a voltage control circuit controlling an output voltage from the voltage conversion circuit or the electric storage circuit to be a predetermined voltage; and
an output switching circuit switching an output of the voltage conversion circuit to the electric storage circuit, or to the voltage control circuit.

16. A communication device using the vibration power generating device according to claim 14.

17. An electronic device using the electrical generating device according to claim 14.

18. A communication device comprising the vibration power generator according to claim 1, and a battery.

19. An electronic device comprising the vibration power generator according to claim 1, and a battery.

* * * * *